Figure 1:
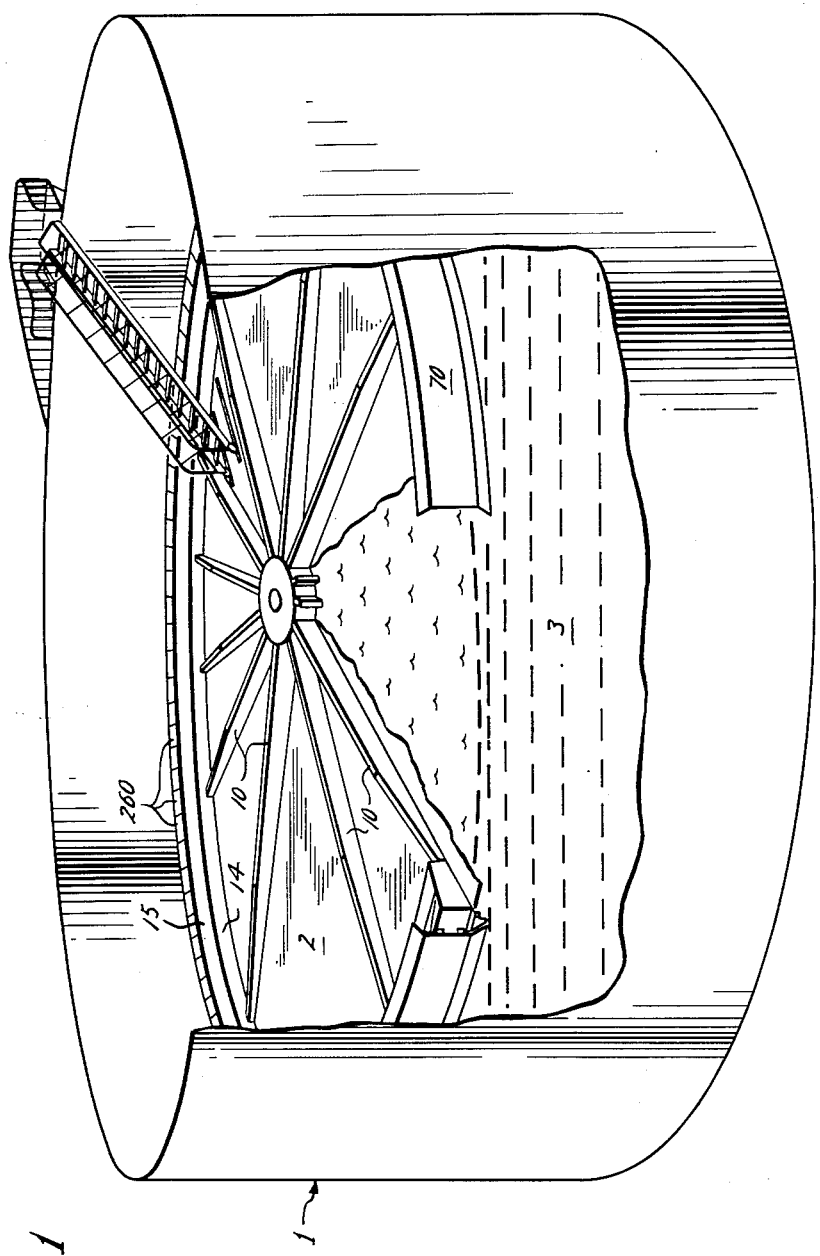

June 6, 1961 W. E. JOOR II 2,987,215
VARIABLE VOLUME STORAGE TANKS
Filed Aug. 15, 1955 12 Sheets-Sheet 1

William E. Joor, II
INVENTOR.

BY Frank B. Pugsley
ATTORNEY

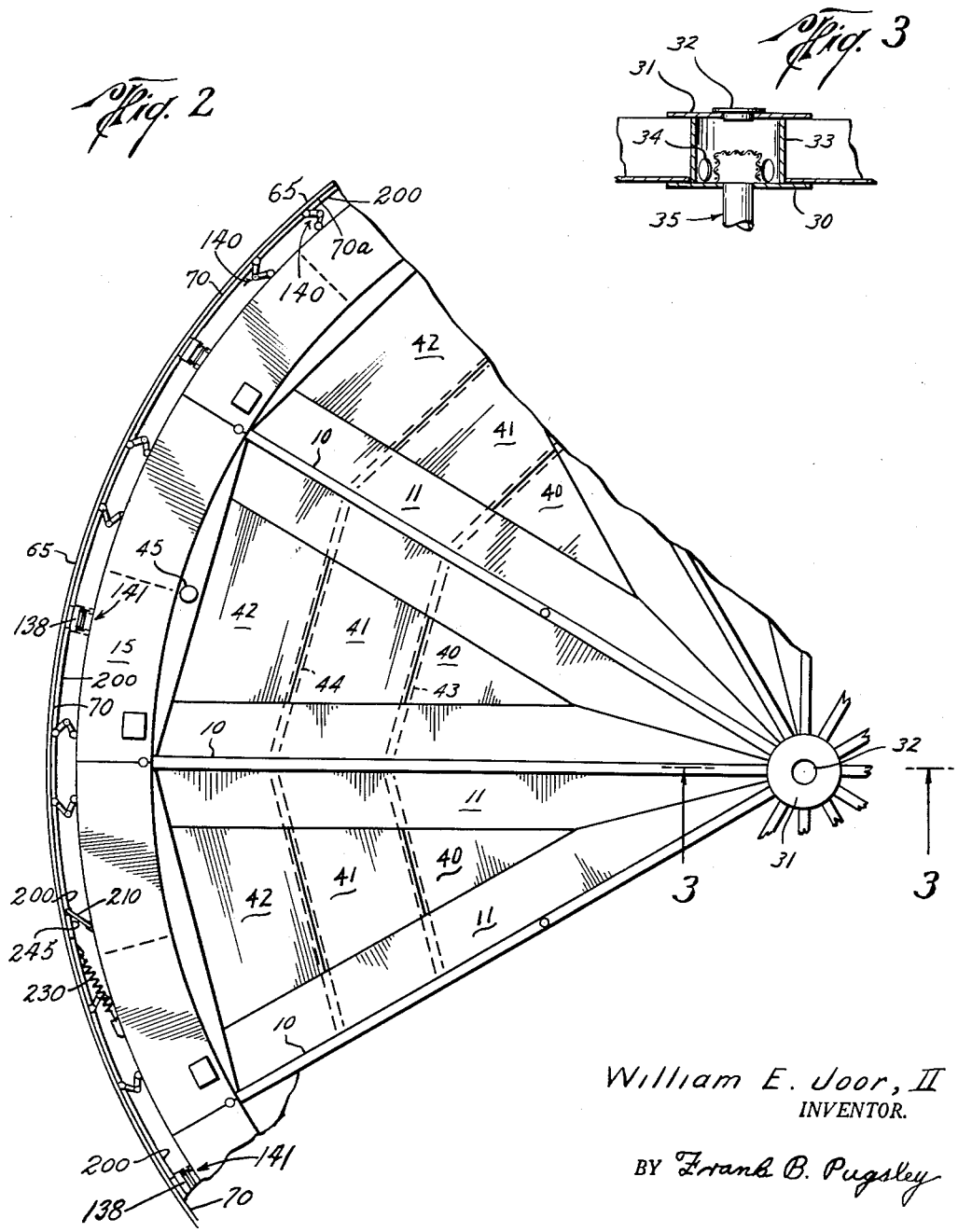

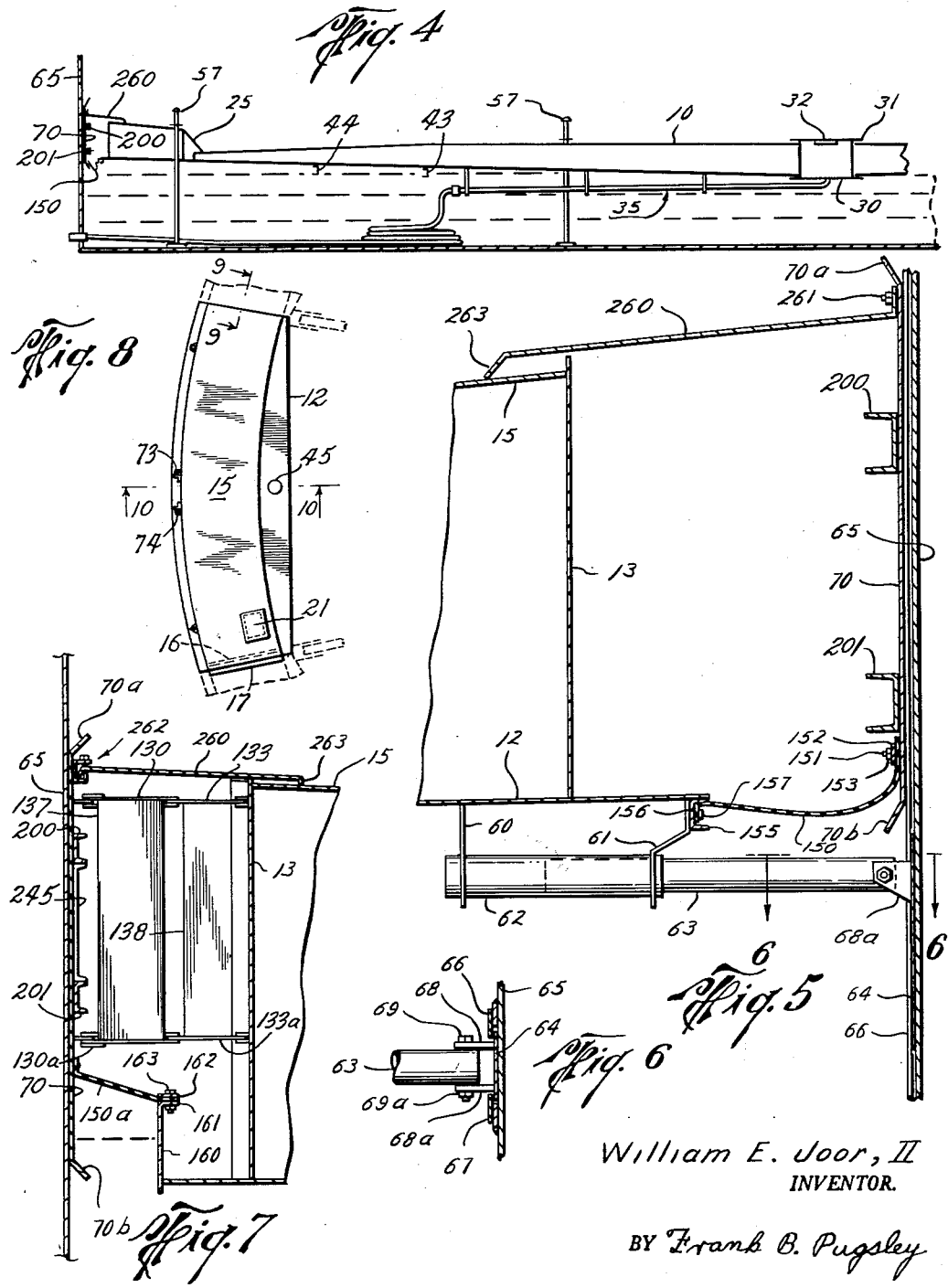

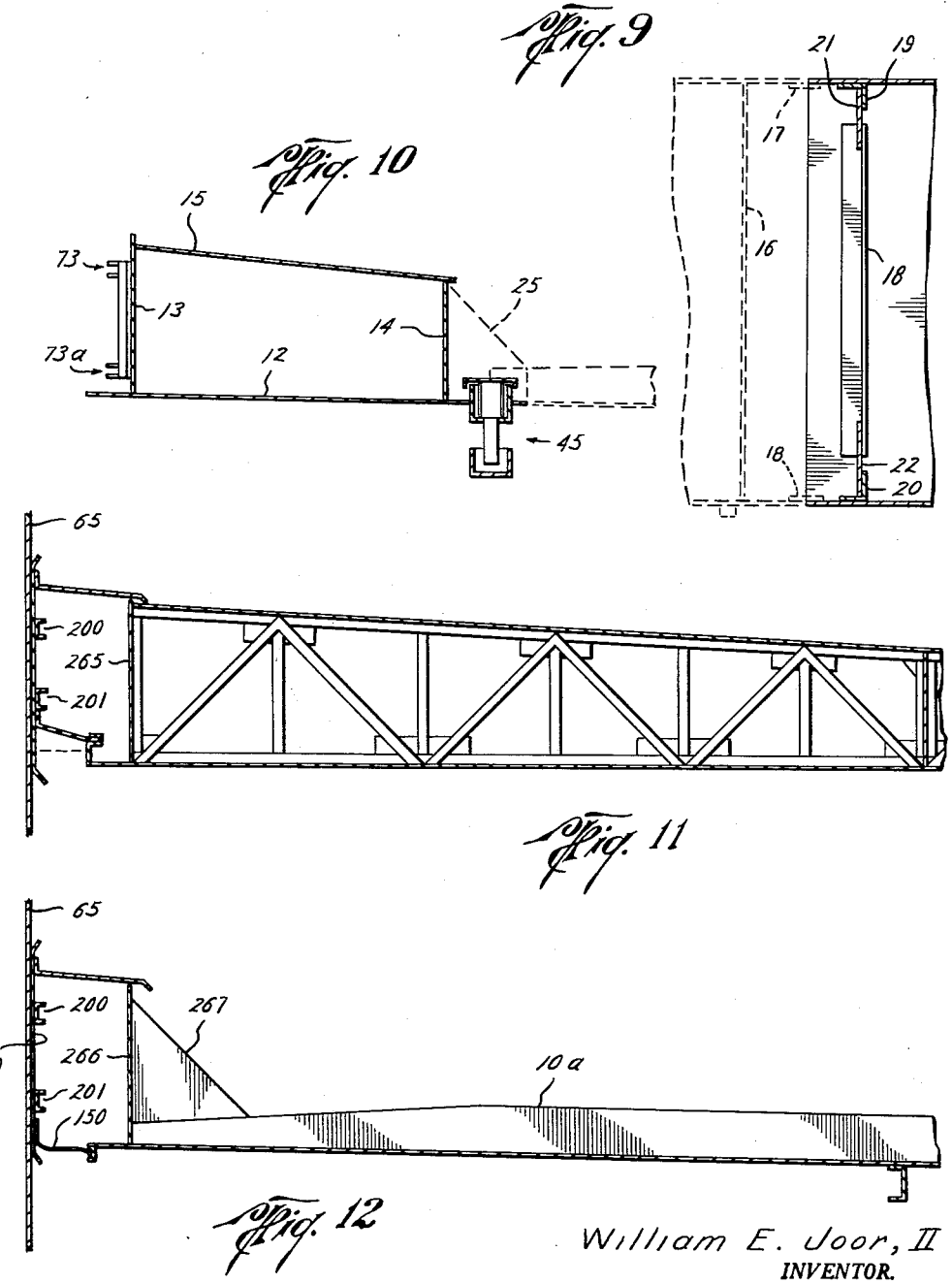

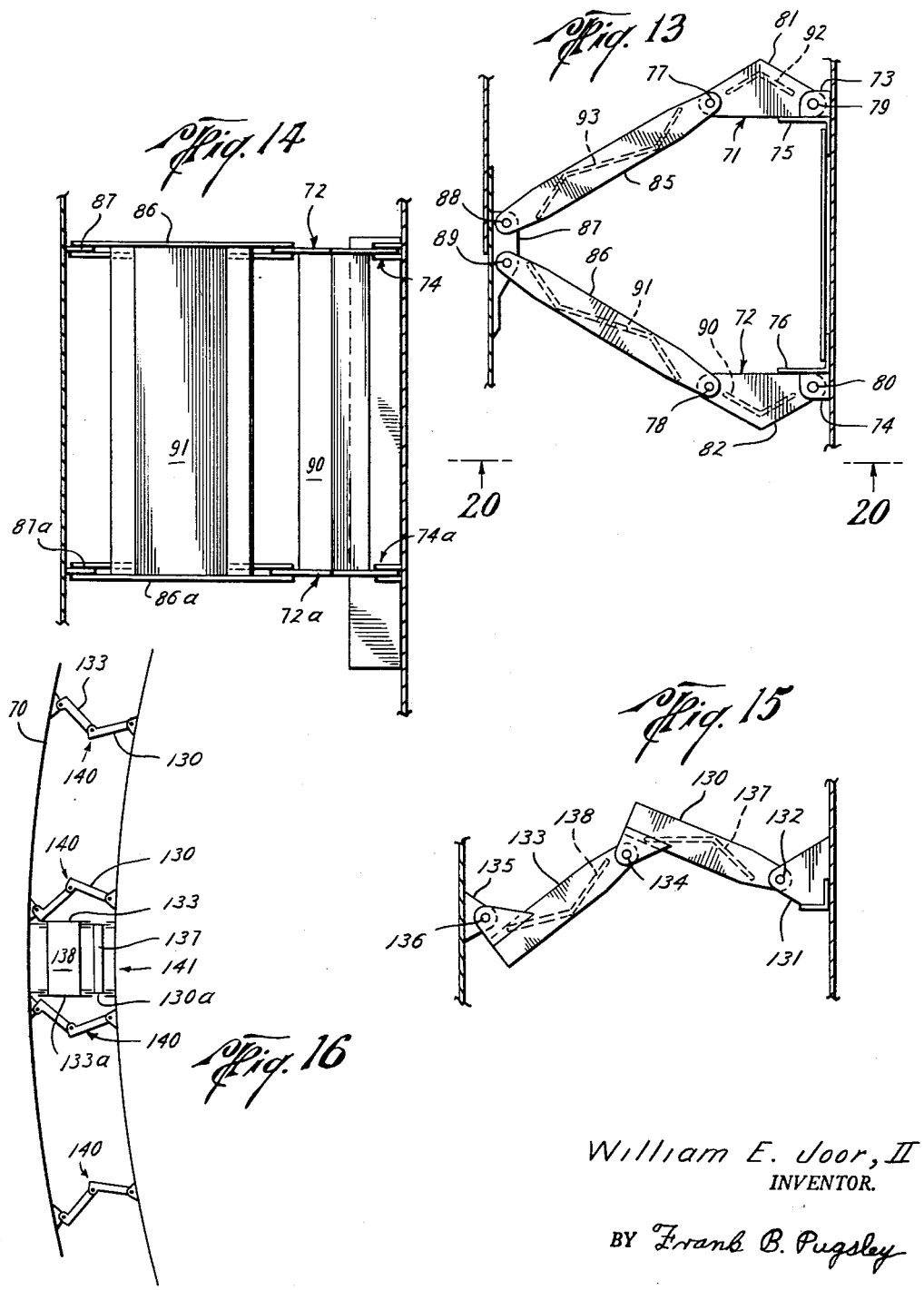

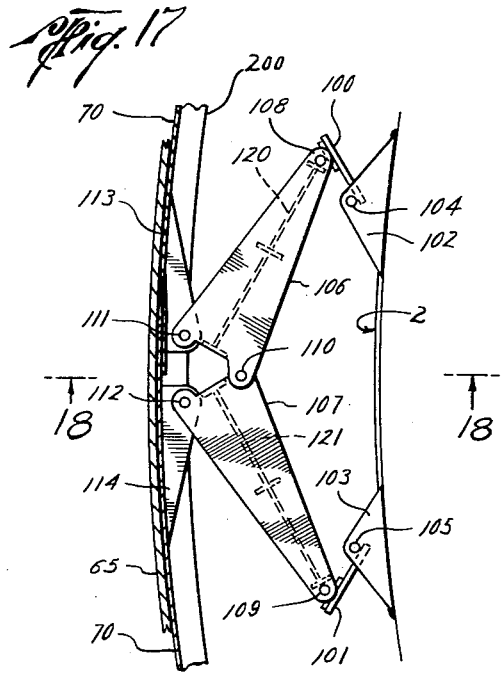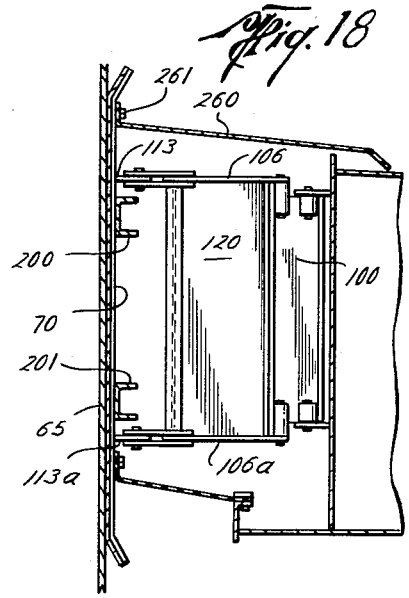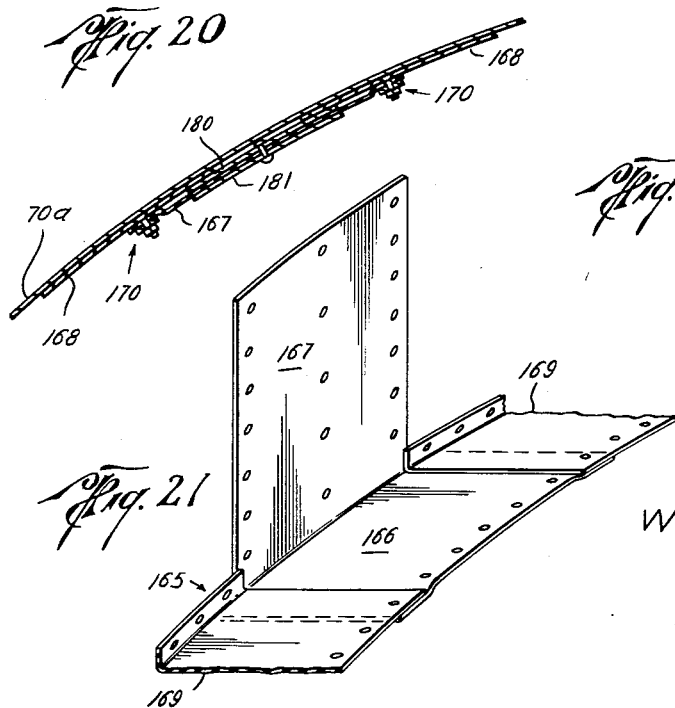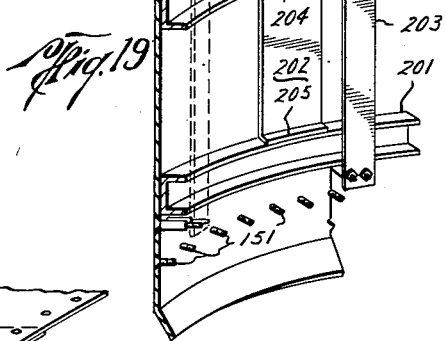
William E. Joor, II
INVENTOR.
BY Frank B. Pugsley
ATTORNEY

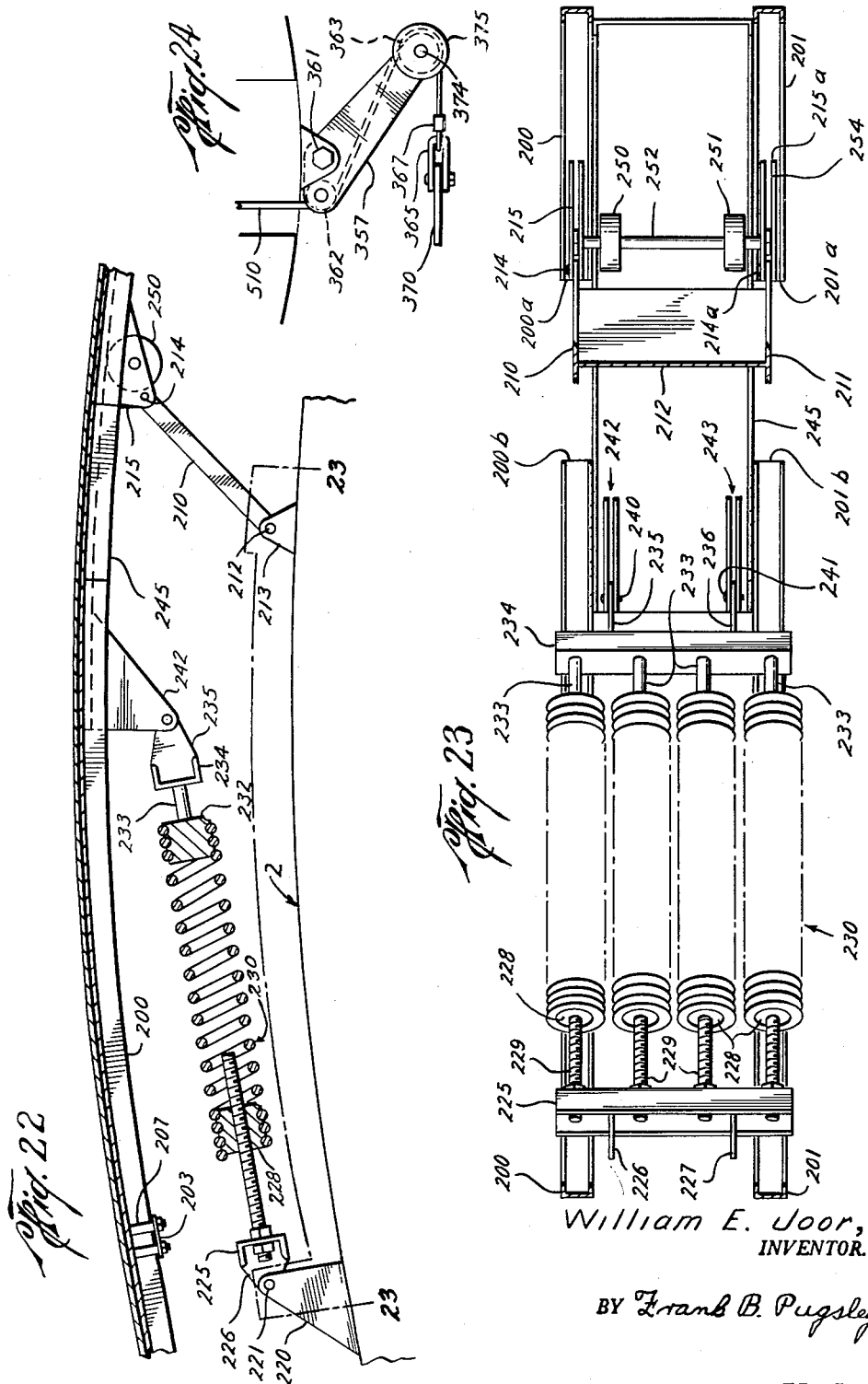

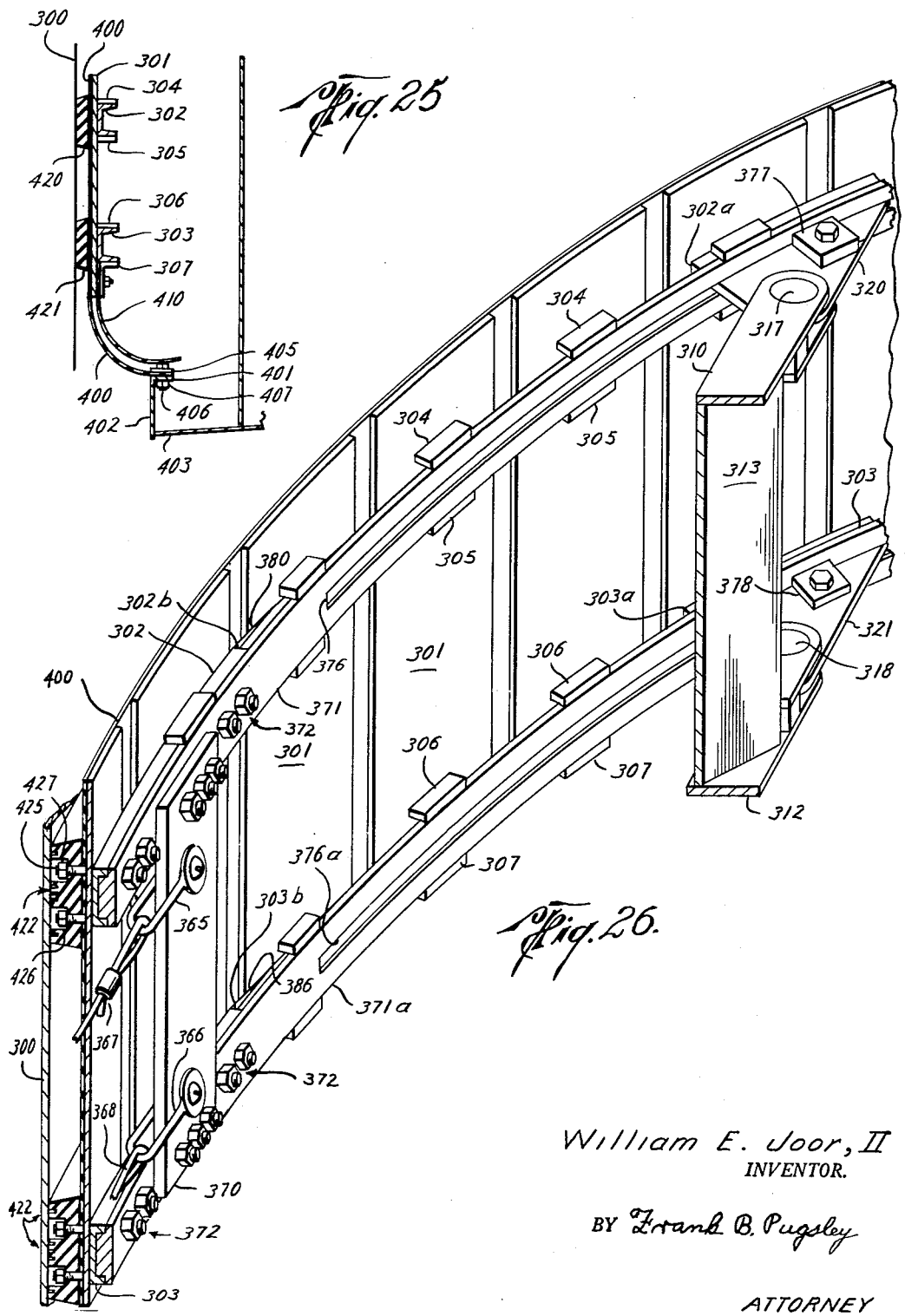

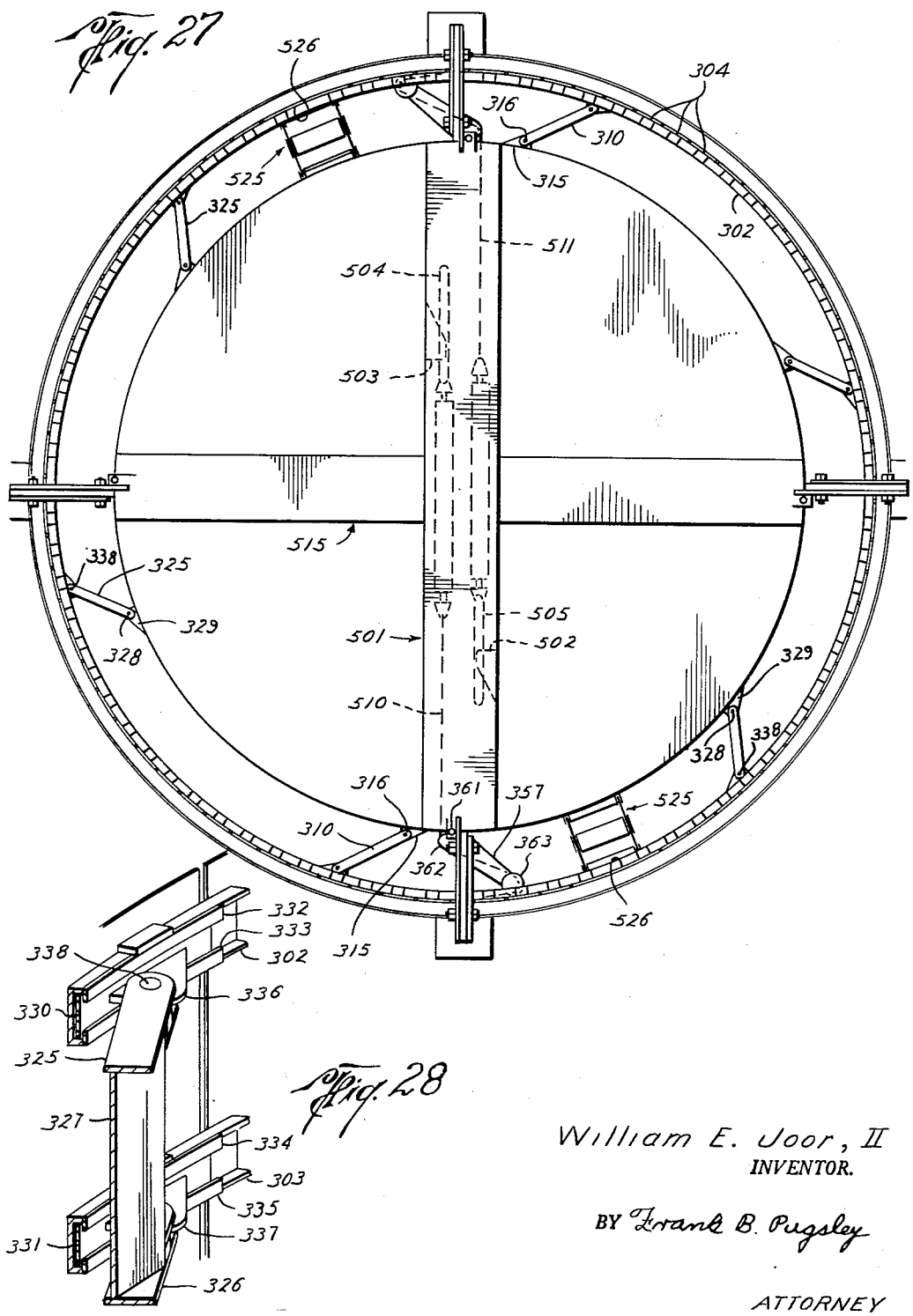

June 6, 1961 W. E. JOOR II 2,987,215
VARIABLE VOLUME STORAGE TANKS
Filed Aug. 15, 1955 12 Sheets-Sheet 10
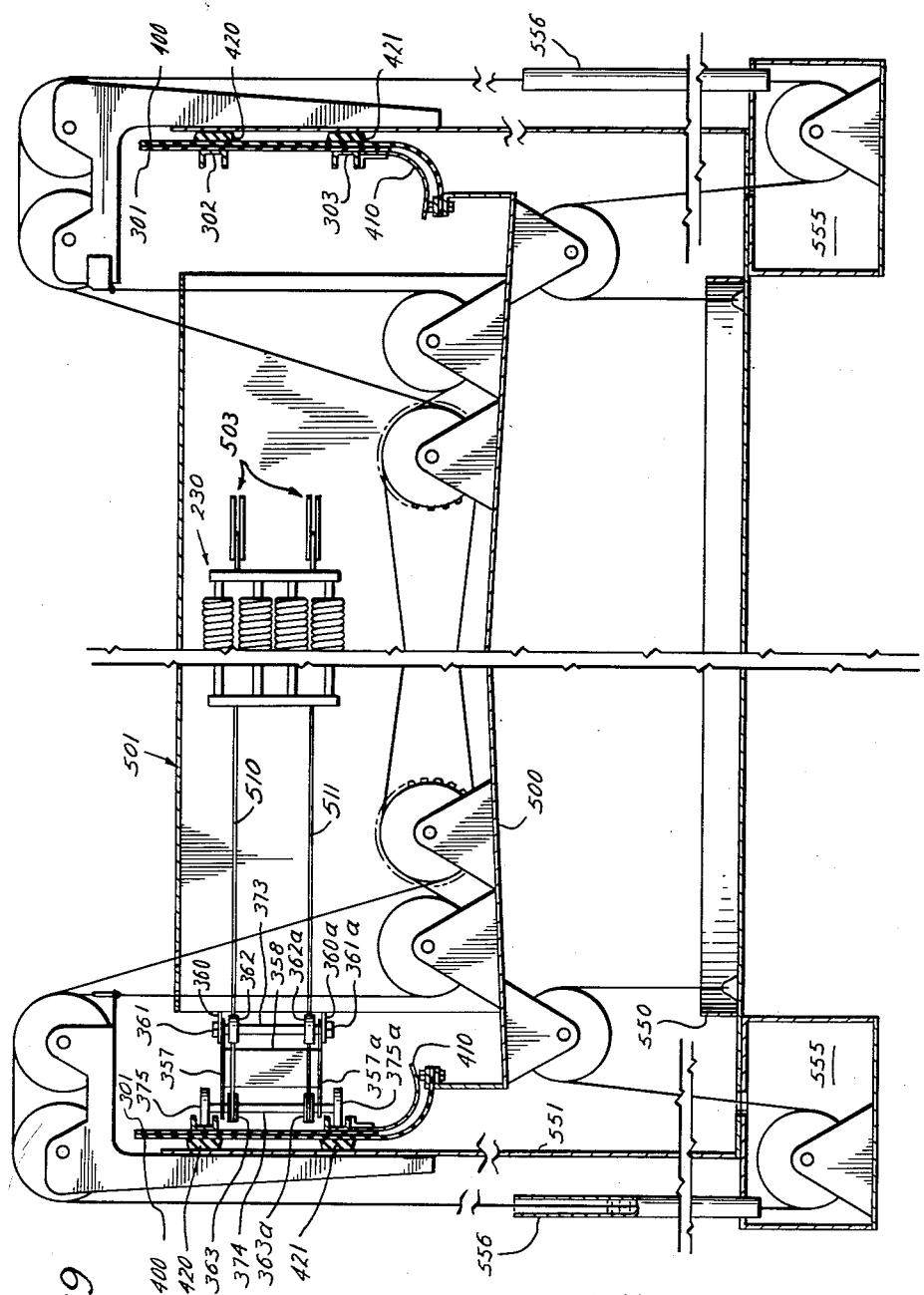
William E. Joor, II
INVENTOR.
BY Frank B. Pugsley
ATTORNEY

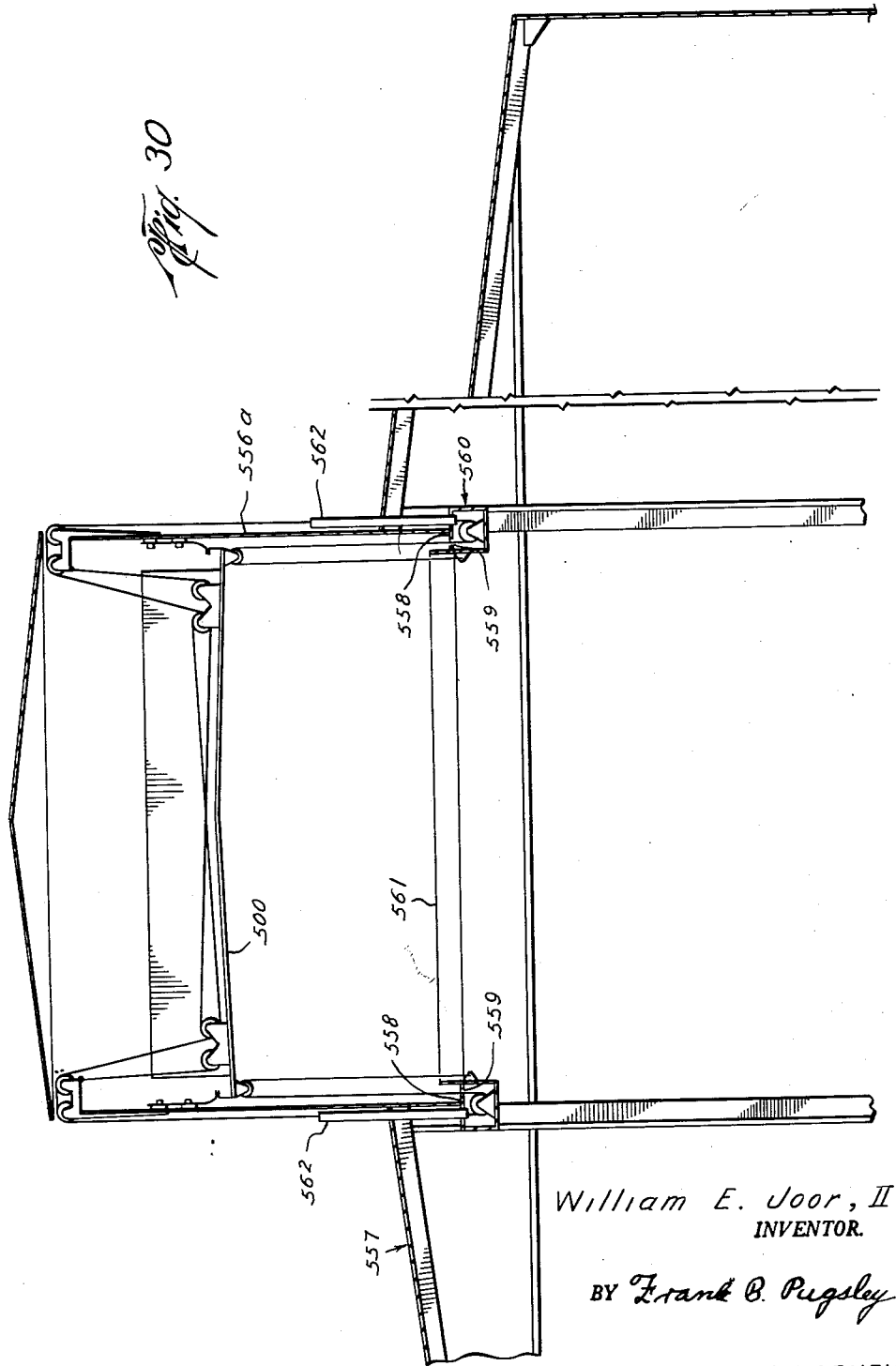

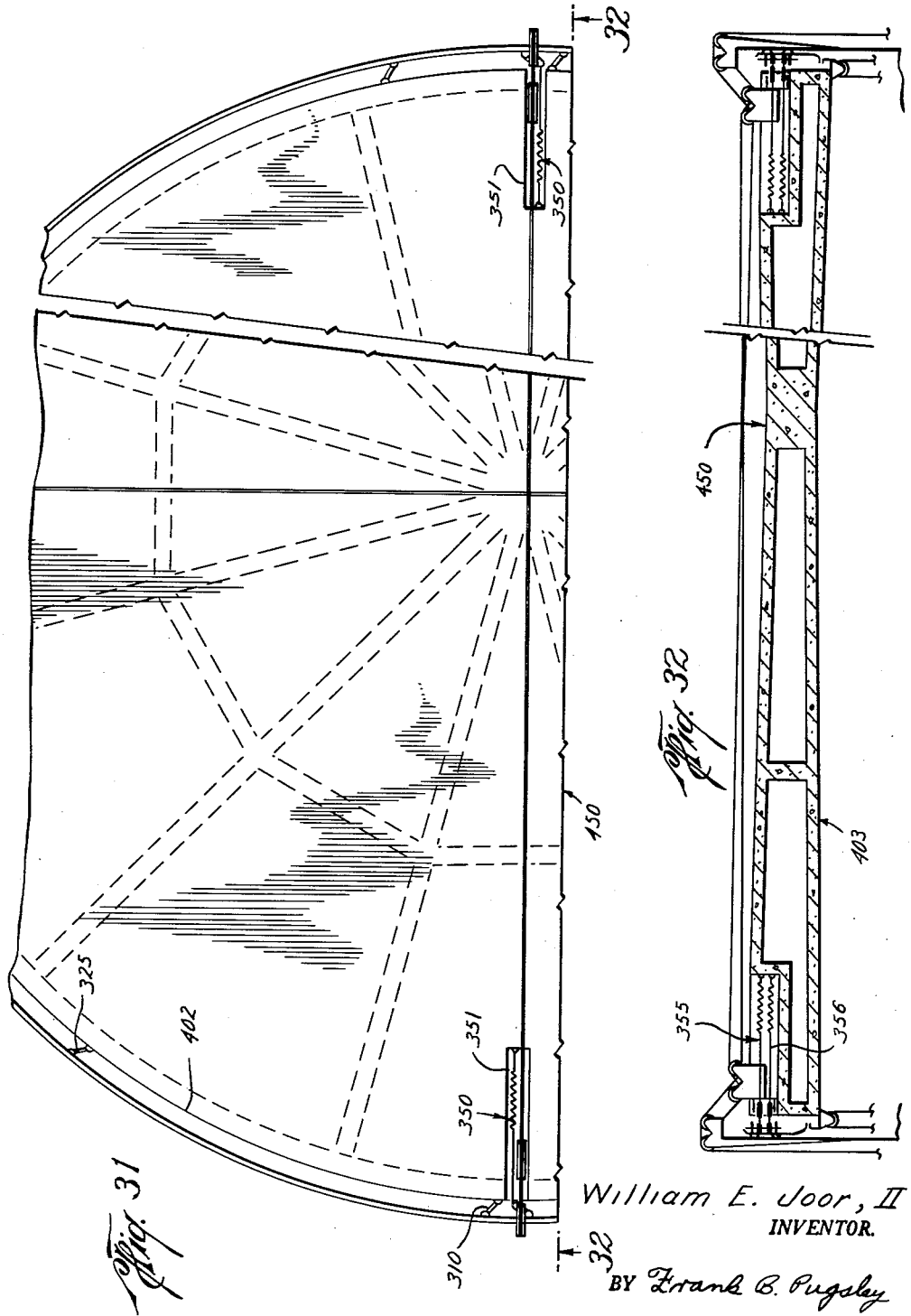

United States Patent Office 2,987,215
Patented June 6, 1961

2,987,215
VARIABLE VOLUME STORAGE TANKS
William E. Joor II, 1306 Ben Hur Drive,
Houston 24, Tex.
Filed Aug. 15, 1955, Ser. No. 528,382
25 Claims. (Cl. 220—26)

This invention relates to improvements in conservation equipment for storing or holding fluids, and more particularly to improved movable covers for liquid storage tanks, gas holders and the like.

The design of floating roof vessels and of peripheral sealing mechanisms to prevent evaporation of the stored liquid from the space between the periphery of a floating roof and the shell of the tank has presented several problems which have never been entirely solved by structures known and used prior to my invention. It is generally accepted in the art that the use of metal plates or shoes with a fabric seal disposed between the shoes and the roof deck is the cheapest and most effective seal mechanism. However, in using such shoes it is necessary to provide a supporting means and a means for urging the shoes outwardly against the side of the tank. Also, an effective seal can be achieved only by having such plates pressed uniformly against the wall of the tank over substantially their entire area. Attempts to solve these problems have, in the past, consisted principally of the use of pressure means operating against each plate at a plurality of points together with complicated linkages designed to support the plate or shoe and permit it to move radially and still maintain a substantially vertical position. Such devices have variable efficiency in solving these problems. However, the more effective structures have the common defect of being complicated and expensive to install and maintain.

Accordingly, a principal object of this invention is to provide a sealing arrangement in which the sealing means are forced against the shell of the tank with substantially uniform pressure throughout their circumference and height.

It is a further object of my invention to provide floating roof tanks having a sealing mechanism between the roof and the shell of the tank which will substantially eliminate any exposed surface of the stored liquid between the roof and the shell and thus reduce evaporation losses.

A further object of my invention is to provide a gas tight sealing mechanism for use in connection with piston type movable covers for the storage of gases and volatile liquids.

A still further object of my invention is to provide a floating roof tank having improved means for urging outwardly the peripheral seal employed with piston-type closures for variable volume fluid storage vessels.

Other objects as well as advantages of my invention will appear in the following specification, drawings and appended claims.

The present invention primarily involves my discovery that a highly effective biasing means suitable for urging the sealing mechanism of a floating roof tank piston into engagement with the wall or casing may economically be made by restraining extremely long columns at one end and loading the other end of each such column so that it will bend in an arc and thereby press against a plurality of shoes to maintain them in close engagement with the side wall of the tank. Also, the novel biasing means I have invented may be modified for use in the construction of pressure retaining seals for piston type gas holders. Another feature of my invention resides in the herein described hinge supports which support and stabilize the shoes by attaching means cooperating with the longitudinally loaded arcuate beams to prevent substantial circumferential movement of the shoes and permit limited circumferential movement of the columns in sliding engagement across said shoes.

My invention may best be understood by reference to the following drawings in which FIG. 1 is an isometric view, shown partly in section, illustrating a pontoon type floating roof tank which discloses a preferred form of my invention; FIG. 2 is a fragmentary plan view of a portion of the roof shown in FIG. 1; and FIG. 3 is a vertical section view, taken on lines 3—3 of FIG. 2.

Other details of my invention are shown in the following drawings in which FIG. 4 is a vertical sectional view showing a portion of the floating roof illustrated in FIG. 1; FIG. 5 is a fragmentary vertical sectional view of the periphery of the floating roof shown in FIG. 1 in which various details of the annular seal and an anti-rotating device are shown; and FIG. 6 is a horizontal sectional view taken on line 6—6 of FIG. 5 and shows the construction of the anti-rotating device I employ in combination with this roof. FIG. 7 is a vertical sectional view of the periphery of a form of my invention disclosing a modified seal construction and various details of the supporting and biasing means for this seal.

Construction details of portions of the floating roof illustrated in FIG. 1 are shown in FIGS. 8, 9 and 10 in which FIG. 8 shows a shop subassembly which is illustrated in a fragmentary view disclosing a construction unit of an annular pontoon adapted to be employed with the peripheral seals of my invention. FIG. 9 is a vertical section taken along lines 9—9 of FIG. 8. FIG. 10 is a vertical section taken along lines 10—10 of FIG. 8 and discloses an emergency drain employed in combination with this roof.

Other forms of sealing means embodying my invention are shown in FIGS. 11 and 12. A modified seal is illustrated in the vertical sectional view of FIG. 11 in combination with a twin deck floating roof. The presently preferred form of peripheral sealing means is shown in combination with a pan-type roof in FIG. 12 which is a vertical sectional view of a pan type roof.

One form of the hinge mechanisms I employ to support the peripheral seals used with my floating roofs is shown in FIG. 13, which is a plan view of a hinge adjacent to the end of a shoe. FIG. 14 is a vertical section taken along lines 14—14, shown in FIG. 13. The presently preferred form of my shoe support mechanism is shown in FIG. 15, which is a plan view of a supporting hinge which may be employed to support and stabilize the shoes and to permit radial extension of the shoe with respect to the roof. FIG. 16 is a plan view of a shoe installation using a plurality of hinges of the type illustrated in FIG. 15.

Another novel shoe support mechanism is shown in FIG. 17, which is a plan view of the seal mechanism of a floating roof tank. FIG. 18 is a vertical cross-section taken along lines 18—18 shown in FIG. 17.

FIG. 19 is an isometric drawing, partly in sections, showing the outward biasing beams as they are held in place against a shoe employed as a part of the seal mechanism for my floating roofs.

A modified seal, employing spaced shoes and a resilient seal between the shoes, is shown in FIGS. 20 and 21.

The mechanism I employ to urge the sealing plates outwardly into close contact with the vessel wall is illustrated in FIGS. 22 through 26. FIG. 22 is a plan view showing the disposition of the shoe biasing means I employ, comprising horizontally disposed columns or beams together with the spring loading means I employ to load one end of the beams and a restraining hinge disposed at the opposite end of adjacent circumferentially aligned beams to restrain longitudinal movement of said beams. FIG. 23 is a vertical section taken along lines 23—23 of FIG. 22 and this view discloses further details of this mechanism including the bridging means between the ends of adjacent circumferentially aligned beams. A modification of my sealing mechanism is shown in FIGS. 24 through 26 in which FIG. 24 is a plan view of a modified spring mechanism and connecting means; FIG. 25 is a vertical sectional view of a gas tight seal and FIG. 26 is an isometric view of this type seal showing a modified form of the outward biasing means and shoe support means for spaced shoes.

Another modified form of my invention illustrating further the use of end-loaded beams as a means for urging the seal mechanism outwardly against a tank wall is shown in FIGS. 27 through 29. FIG. 27 is a plan view of a piston-type gas holder in which a modified form of my novel seal baising mechanism is employed in combination with a gas holder seal. FIG. 28 is an isometric view shown partially in section disclosing a support means I employ for use with my pressure seals. FIG. 29 is vertical sectional view of the gas holder shown in FIG. 27 and discloses further constructional details of this modification of my invention.

A modification of my gas holder invention is disclosed in FIG. 30 which discloses a vertical section illustrating a breather roof for large tanks.

FIG. 31 is a plan view of another embodiment of my invention showing a concrete floating roof with a pressure-retaining seal. FIG. 32 is a vertical section taken along lines 32—32 shown in FIG. 31 and further illustrates this modified form of my invention.

*Floating roofs and peripheral seals*

In the design of floating roof tanks, a reciprocally movable closure is provided which comprises an impervious body, usually called a floating roof, and a peripheral seal.

It is necessary to provide clearance in a radial direction between the outside periphery of the floating roof and the shell of the tank in order to permit the roof to rise and fall on the liquid surface in the tank when the shell is out-of-round or when the diameter varies with the height. The shells of tanks of this type are fabricated in the field by welding together large steel plates which have been previously formed to a cylindrical shape. In the building of large tanks of this type under field conditions it is very difficult to maintain close out-of-roundness tolerances because the welding operation tends to cause the plates to buckle or become distorted and because even slight errors in leveling the foundation will make it very difficult to build a round and straight cylindrical shell. For these reasons a radial tolerance ranging from 10 to 15 inches, depending on the size of the tank and the other tolerances maintained in its construction, is necessary to permit rise and fall of the roof without jamming.

If this annular space were left open to the atmosphere it would in a large measure defeat the purposes of the floating roof in conserving vaporization losses from the stored liquid and eliminating the fire hazard when inflammable liquids are stored therein. Therefore, it is customary to provide a sealing mechanism to support a sealing material between the roof and the shell such as the two forms of seal illustrated in FIGS. 5 and 7, respectively. In the embodiment of my novel sealing mechanism illustrated in FIG. 5 the reference numeral 70 is used to designate a large rectangular, preferably arcuate, plate known as a shoe. Said shoe is preferably provided with an upper inwardly disposed lip 70a and a lower inwardly disposed lip 70b. Such lips may be made integral with said shoe and permit the shoe to readily slide over obstructions in the tank wall. In the form of seal shown in FIGS. 2, 3, 4 and 5, a plurality of these shoes are disposed about the perimeter of the roof in overlapped relationship.

My improved peripheral seals may be used with any suitable or desired vessel and floating roof structures. However, I presently prefer to employ structures such as the tank 1 and roof 2 which are employed in a preferred embodiment of my invention illustrated in FIGS. 1 through 4. The illustrated cylindrical tank 1 is adapted for the storage of liquids, particularly volatile petroleum products. Within the tank 1, the floating roof 2 is supported by the stored liquid 3 and it in turn supports the peripheral sealing means.

The illustrated roof 2 is a rigid, stable structure utilizing radial box grider construction having strength and stability with a minimum amount of bracing. The principal components of this structure may be made almost entirely from flat metal plates. It is a pontoon type roof having a circular pontoon around the periphery of the roof itself. The radial box girders 10 as shown in FIGS. 1 through 4 taper from the outer ends to a point near the center of the length of the girder and then remain of substantially constant cross section to the center of the roof. Girders of this general type may also be used for radial bracing in the construction of various floating roofs such as the pan-type roof illustrated in FIG. 12.

FIG. 8 illustrates a construction unit comprising a single pontoon section which may be prefabricated for use in the construction of a floating roof deck such as the one illustrated in FIGS. 1 through 4. The annular pontoon shown in FIGS. 1 and 2 may be constructed from a plurality of such sections which are welded or otherwise imperviously attached together in the assembled roof to form a complete ring-like pontoon integral with and disposed at the periphery of the roof.

The vertical section in FIG. 10 shows other features of the illustrated form of pontoon structure which is generally box-shaped in cross-section with vertical side walls 13 and 14 and a sloping top wall 15 which drains inwardly towards the center of the roof. Each pontoon section is preferably sealed adjacent one end with a plate such as plate 16 shown in FIG. 9. Also illustrated are upper and lower strips 17 and 18 which extend beyond the edge of the pontoon section and overlap the next adjacent pontoon section to serve as guides in fitting together and assembling the sections in the field. Pontoons may be braced as desired by stiffening elements such as the elements 18, 19 and 20 illustrated in FIG. 9 together with gusset plates such as plates 21 and 22. A removable inspection plate 21 may be conveniently located in the upper pontoon wall 15 as shown in FIG. 8. When assembled, the annular ring is divided into airtight, rigid compartments separated from one another by end plates 16. At the center of floating roof 2, I provide a cylindrical tube 33, a bottom center plate 30 and a top center plate 31. The top plate 31 has an opening and a removable cover 32. The cylindrical tube 33 is provided to brace the center portion of the deck. Ventilation and drainage are provided by ports 34 in the tube 33, which ports are disposed between the radial box girders. The bottom plate 30 has an opening provided with a drain 35.

The girders 10, together with integral plates 11 provide a substantial part of the deck area when these units are assembled to form the roof structure. In addition, deck plates 40, 41 and 42 as shown in FIG. 2 are provided to fill the area between each adjacent pair of radial girders. Annular rafters 43 and 44 are shown spaced intermediate the center of the deck and the periphery, said rafters being affixed to the underside of the deck. Preferably, the deck plates, or any other suitable deck plates arranged and configuration as desired, may be used provided the assembled plates fill the space between the adjacent radial girders so that an impervious roof may be constructed. The floating roof structure may be welded or otherwise constructed so as to be impervious to liquids and vapors.

The overall design of the deck of the floating roof 2 is an inverted cone with the apex of the cone near the center of the tank. This design permits drainage of rain water to the center and removal therefrom. An emergency drain 45, or a plurality thereof, may also be provided adjacent the annular pontoon to permit drainage of excess water into the liquid storage area should the central drain fail to function.

I presently prefer to further stabilize floating roofs employed in combination with my sealing members by the use of an anti-rotating device. The tongue and groove assembly illustrated in FIGS. 5 and 6 is a suitable device for this purpose. It is secured to the underside of the periphery of the roof by brackets 60 and 61 spaced radially and affixed to the roof. These brackets support a radially disposed sleeve member 62 and shaft 63 slidably mounted therein. At the extremity of the shaft is provided the sliding plate 64 which is slidably retained in engagement with the side wall of the tank 65 within the vertically disposed retaining plates 66 and 67 to prevent rotation but to permit vertical movement of said roof.

Each of the shoes employed in seals used in combination with floating roofs is supported at the perimeter thereof by radially extensible hinges. The purpose of these hinges is to permit the shoes to flex inwardly and outwardly in a radial direction and to maintain a sealing relationship with the wall 65 of the tank adjacent to said shoes. To do so the amount of overlap of adjacent shoes must be varied; however, it should be noted that there is some overlap at all times.

One form of my shoe supporting hinges, adapted for use at the ends of the shoes, is shown in FIGS. 13 and 14. This hinge design consists basically of an upper and lower hinge assembly in which each assembly comprises four interconnected movable leaves. The first pair of these leaves 71 and 72 are rotatably secured to the lugs 73 and 74. As will be seen from the drawing, these leaves rotate in a limited arc between the stops 75 and 76 and the peripheral wall of the floating roof. In the latter direction of rotation, the movement is prevented from exceeding a position in which the connecting pins 77 and 78 would pass the connecting pins 79 and 80 respectively in an inward direction by means of the laterally extending sides 81 and 82 made integral with these leaves of the hinge. If further rotation of either of these leaves toward the wall of the roof were permitted, the hinge might lock and thus interfere with the free outward movement of this leaf of the hinge and, also, this feature of this hinge has the further important function of limiting the circumferential movement of the shoes 70 in relation to the roof 2. The second pair of leaves 85 and 86 are rotatably secured at their inner ends to the outer ends of the first pair of leaves by pins 77 and 78 and, at their opposite ends, they are secured to the lug 87 which is attached to the end of the shoe at a point adjacent to the end of said shoe by pins 88 and 89. This connection is made integral with the inside shoe at the overlapped portion of the two shoes. It should be noted, as may be clearly seen in FIG. 14, that the hinge is a double hinge, having upper and lower hinge assemblies which are connected by angular shaped web members such as the members 90 and 91 which are disposed between the upper and lower leaves 72 and 72a and 86 and 86a, respectively. Likewise, the upper companion leaves 71 and 85 of this hinge are connected to two substantially vertically aligned lower hinge assemblies (not shown), each of said upper and lower assemblies being interconnected by web members 92 and 93 in the manner as described above. Thus, since the shoes are secured at their top and bottom to the roof by these hinges at lugs such as 74 and 74a and the hinges support the shoes by lugs 87 and 87a this type hinge supports adjacent shoes rigidly in a vertical direction. This shoe-supporting hinge is relatively inexpensive and easy to install in the field.

A modified hinge support mechanism, also employed to support the ends of adjacent shoes, is shown in FIGS. 17 and 18. This hinge mechanism is an automatically compensating hinge which is also basically composed of four rotating leaves. The first pair of leaves 100 and 101 comprise vertically disposed plates which are rotatably secured to the lugs 102 and 103 by pins 104 and 105 respectively. The lugs 102 and 103 are affixed to the periphery of the roof. The second pair of leaves 106 and 107 of this hinge are rotatably secured at one end of each hinge to the outer end of the first pair of leaves by pins 108 and 109 and these second leaves move inwardly with the rotation of the first leaves. It should be noted that the second pair of leaves 106 and 107 are secured to each other by a pin connection 110 near the shoes and that these same leaves are rotatably secured to the ends of adjacent shoes 70 by the pins 111 and 112 passing through clips 113 and 114 respectively. Said clips 113 and 114 are attached to adjacent overlapping shoes at points near the ends of said shoes. As will be seen from the drawing FIG. 18, this hinge mechanism is a double hinge in which the first pair of leaves 100 and 101 comprise flat plates disposed in a vertical direction between linkages of upper and lower hinge assemblies. The upper leaf 106 is connected to a lower leaf 106a by a vertically disposed web member 120. In like manner upper leaf 107 is connected to a lower leaf (not shown) by the vertically disposed web member 121.

In operation, this compensating hinge is so constructed that when the shoes are moved inwardly from their outermost position the pin 110 fastening the second pair of hinges moves inwardly along a radial line, whereas each pin 111 and 112, securing a leaf to a shoe, will move in a line toward the radial line traced by the first pin. Thus it will be seen that the pins attached to the shoe ends move toward each other as the hinge closes. This action automatically compensates for the change in the effective circumferential dimension of the plurality of shoes disposed around the periphery of the roof as said shoes move inwardly from their outermost position. The ends of the shoes 70 overlap one another at all times; however, the extent of the overlap is increased as the shoes move inwardly. A feature of this compensating hinge is that it provides support for both ends of the shoes giving great stability to each shoe and preventing circumferential movement of the shoes 70 relative to the roof 2 while permitting movement in a radial direction.

It will be apparent that the maximum variation in overlap of adjacent shoes will depend upon the difference in the circumference defined by the plurality of shoes at their extreme outer and extreme inner positions divided by the total number of shoes. Moreover, the distances between the central pin 110 and the pins 111 and 112; the distances between pin 110 and pins 108 and 109; and the rotating length of the leaves 100 and 101 may be readily determined by graphical methods in which the locus of the travel of pin 110 is a straight radial line and pins 111 and 112 move on a convergent line between the extreme outer shoe position with minimum overlap of the shoes and the extreme inner shoe position with maximum overlap of the shoes.

A preferred hinge support adapted for use with the sealing shoes and biasing means I employ is shown in FIGS. 15 and 16. This hinge is a double hinge comprising two pairs of aligned leaf members which are attached to the shoe and to the wall of the roof at points vertically or horizontally aligned and spaced apart to give vertical or horizontal stability to the shoe and to allow space for the installation of my outward biasing means. Each element of this hinge is composed of two leaves, In the upper element in FIG. 15, the first leaf 130 is rotatably secured to the clip 131 attached to the periphery of the roof by pin 132 and the second leaf 133 is rotatably attached to the outer end of the leaf 130 by pin 134. The outer end of leaf 133 is rotatably attached to the clip 135 by pin 136. The upper and lower leaves 130 and 130a and 133 and 133a are connected by web members 137 and 138 respectively. This hinge may be used with my compensating hinge for the ends of the shoes shown in FIGS. 17 and 18 or with the supporting hinge for the ends of shoes shown in FIGS. 13 and 14. When so used this hinge supports the shoe intermediate its ends, maintaining its alignment in a vertical direction and also permitting the shoe to move in and out in a radial direction.

FIG. 16 illustrates an important use of a plurality of hinges such as the hinge shown in FIG. 15 in which hinges of this type are used as the sole supporting and stabilizing means for the shoe 70. This assembly has a plurality of vertically aligned hinges 140 which are spaced lengthwise of the shoe 70 giving said shoe vertical stability and permitting inward and outward movement of said shoe radially respecting the roof 2. The shoe is given circumferential stability by a horizontally disposed hinge 141 which may also be the same as the hinge shown in FIG. 15. An obvious advantage of this supporting installation is the fact that the hinges are all of one type and may be mass produced and easily installed.

An additional feature of my invention is the provision of a gas and liquid tight flexible seal which is disposed between the shoes and the roof deck adjacent to the lower edge of said shoes and in contact with the liquid surface in the embodiments shown in FIGS. 4, 5 and 12. By thus placing the seal directly against the liquid surface, the hydrogen sulphide gases which are contained in many petroleum oil vapors and other corrosive gases and vapors are effectively prevented from contacting the metal parts of the seal mechanism. This seal 150 consists of a fabric material usually made of a woven cloth using asbestos, cotton, glass or plastic fibers which is covered on each side with a rubber-like compound such as Neoprene, "Buna-N," "Thiokol" or a combination of these materials and/or rubber or plastic-like materials which are insoluble in the hydrocarbon oil and gases stored in the tank. The seal 150, when fabricated, is configured in the shape of a large diameter flat ring with the sheets composing the seal lying mostly in a horizontal plane. The inner edges of the seal in its installed position are turned downward and the outer edges upward, said seal being secured at its outer edges to the shoes by the bolts 151. These bolts are stud bolts welded or otherwise secured to the shoe. Thin, strip-like bars 152 (FIG. 5) with holes punched to fit the spacing of the stud bolts and the holes in the outer vertical flange of the seal are used to secure the seal to the shoes. These bars are held in place by nuts 153.

The seal may be further secured against leakage by the use of a cement compound between the coated fabric and the plate composing the shoe which effects a bond between the rubber and the seal plates.

The inner edges of the seal are secured to the roof in any suitable manner such as the method shown for securing the outer end of the seal to the shoes. However, in the preferred embodiment of my invention I provide a peripheral channel 155 circumferentially aligned around the outer periphery of the floating roof deck and affixed to the underneath side of said deck plates. A downward vertical flange 156 of the seal is caused to pass into the groove formed by the channel and a thin band 157 of stainless steel is passed around the outer circumference of the roof within the groove of the channel and over the portion of the seal within the channel. Thus by tightening this thin band of stainless steel the entire peripheral edge of the seal may be affixed to the perimeter of the roof. Here, also, a cementing compound may be used to bond the rubber-coated fabric to the circular channel around the perimeter of the roof.

A modified form of this flexible seal is shown in FIGS. 7 and 11. In this embodiment the seal 150a is disposed above the liquid level but below the working parts of the seal support mechanism so as to facilitate removal of the seal after the roof is installed. The seal is attached to the perimeter of the roof by any suitable means such as the upstanding rim 160 which has a perforated lip 161 disposed below the perforated inner edge of the seal 150a. Above the inner edges of the seal a perforated metal strip 162 is attached by means of bolts 163 and companion nuts. The outer edge of the seal is attached to the shoe by any suitable means such as the metal strip attachment shown in FIG. 5.

Another modification of my sealing mechanism is shown in FIGS. 20 and 21 in which the shoes are spaced apart as in FIG. 26 rather than overlapped as I have previously described. The seal 165 which I prefer to employ in this embodiment comprises a horizontally disposed flat ring similar to the rings 150 (FIG. 12) and 150a (FIG. 7) which has a plurality of upwardly extending flaps 167. These flaps are disposed between adjacent spaced shoes and both the flap 167 and the portion of the ring 166 adjacent the flap are composed of an integral piece of flexible material. Preferably this flap and adjacent portion of the ring is composed of resilient flexible material such as rubber, "Buna-N" or the like so that the seal may be expanded and contracted circumferentially when the shoes 168 are moved inwardly and outwardly respecting the roof to accommodate for changes in the diameter of the shell 70a of the tank. Between the resilient sections 166 of the horizontally disposed ring, I provide flexible sections 169 of non-resilient, rubber-coated fabric such as I have heretofore described in connection with my seal 150. The joints between the sections 166 and 169 may be overlapped and vulcanized as shown or sewed and cemented.

In FIG. 20 the modification of my sealing means is shown installed in a horizontal partial section. The vertical edges of the flap 167 are attached to adjacent spaced shoes by any suitable attaching means such as the stud bolts and bar arrangement 170. In addition I provide an outer protective metal plate 180 disposed between the resilient flap 167 and the adjacent spaced shoes 168. Also an inner metal plate 181 is disposed in opposed relationship adjacent said outer plate and inside the flap 167. The two plates 180 and 181 are attached to said resilient flap by means of a row of rivets disposed substantially at the vertical center line of said flap. Said rivets pass through plates 180 and 181 and through the flap 167 holding these plates in close face-to-face relationship respecting said flap 167. These plates are of substantially the same height being somewhat narrower than the flap 167. They are preferably of substantially the same depth as the vertical dimension of the shoes 168.

In order to insure that the shoes are pressed outwardly against the shell an additional mechanism is needed and, for this purpose, I provide biasing means comprising a spring mechanism employed in conjunction with one or more restrained beams. The beams I employ are extremely long and flexible, compression members which are longitudinally compressed by a suitable compressing means acting upon opposite ends of each said beam. Suitable means for this purpose are shown in the drawings wherein each of the beams is restrained at one end and the other end is subjected to a heavy load whereby each beam tends to deflect or bend in a bow shape. As the load is increased the bending increases until the beam bows outwardly over its entire length to the extent that it is free of external restraint capable of preventing such lateral deflection. This lateral deflection over the length of the elongated compression member may be made to occur in nearly every such longitudinally compressed member where the $l/r$ ratio, i.e., the length divided by the radius of gyration, becomes a large value, preferably in excess of about 200. In the design of my sealing mechanism I have used this principle to provide a mechanism which may be used to force the shoes against the shell with a substantially uniform pressure. In the embodiment shown in FIGS. 5, 7, 17, 18, 19, 22 and 23, this is accomplished by the use of two extremely long channels 200 and 201, each substantially surrounding the tank and mounted between the attaching lugs for the hinge supports such as lugs 113 and 113a on the inside of the shoes (FIGS. 17, 18). However, two aligned beams, or even more, arranged end to end serially, in the same plane, as in FIG. 26, may be used for surrounding a large tank. These channels are mounted in vertically-spaced relationship, one above the other and are maintained in their horizontal positions, contiguous to the shoes, by a plurality of spacer plates 202 (shown in FIG. 19) and guide or retainer bars 203. Said spacer plate is affixed to the channels and comprises a flat plate with flanges 204 and 205 turned inwardly from the shoe so as to provide elements which abut the upper and lower channel members. Said channel members are further held in place by the bolts 206 and sleeve 207 which elements are also used to support the retainer bar 203 in spaced relationship with respect to the shoe 70. The modification FIGURE 26, to be described hereafter, shows most clearly the general arrangement of the shoes and bowed expander beams, designated 302 and 303 in this form.

One end of each of the two longitudinally compressed beams (hereafter called the upper restrained end 200a and lower restrained end 201a) is fastened to a restrainer hinge by pins and clips as shown in FIGS. 22 and 23. This hinge has a single upper leaf 210 with the inside end of this leaf rotatably secured by pin 212 to clip 213 which is connected to the perimeter of the roof. The outer end of this hinge is fastened by pin 214 to clip 215 which is attached to the upper restrained end 200a of the channel 200. As may be seen from FIG. 23, this hinge is a double hinge with an upper element 210 and a lower element 211 interconnected by a vertical web member 212 passing between these elements. Elements 210 and 211 operatively connect the upper and lower beams to the roof. In this arrangement the lower hinge connection includes the lower pin 214a and clip 215a connecting the hinge to the channel and a roof connection (not shown) which is similar to the upper roof connection described above. This restrainer hinge is made in such manner that it rotates outwardly through an arc which is always less than 90 degrees relative to the roof. This may be accomplished by constructing the hinge with the length of the leaves 210 and 211 sufficiently larger than the maximum outward travel of the shoes so that at its maximum outward movement this restrainer hinge is maintained at an angle less than 90 degrees. In operation, when this hinge rotates outwardly, it presses the beams against the shoe and the shoe against the shell. In such position it cannot rotate outwardly further and thus it holds the connected ends of the two channels so that they cannot be moved further around the circumference of the shell. Thus the restrained ends of the longitudinally loaded beams are prevented from substantial movement relative to their lengthwise direction.

The other ends 200b and 201b of the channels 200 and 201 are subjected to a substantial load by the tension spring mechanism, shown in FIGS. 22 and 23. One end of the spring mechanism is rotatably secured to the clip 220 by pin 221 and in like manner to a similar clip (not shown) which vertically aligned below clip 220. These clips are secured to the channel 225 by means of the attaching ears 226 and 227. The channel 225 is connected to the spring plugs by bolts 229. The spring plugs 228 are affixed to one end of a plurality of springs 230 and each these plugs is provided with a threaded opening which engages the threads of a bolt 229, permitting adjustment of the spring tension by adjusting the position of the plug 228 on the bolt 229. However, other adjusting means may be used; for example, the ears 226 and 227 may be elongated and provided with a plurality of longitudinally spaced holes to receive the connecting pins. At the outer end of the springs 230 plugs 232 are affixed to the spring. This plug is secured to the rods 233 which are attached to the channel 234. The channel 234 is disposed in a generally vertical direction and is connected to the plurality of springs. The forces conveyed to this channel by the springs are passed to the clips 235 and 236 which are rotatably attached by pins 240 and 241 to the double lugs 242 and 243. These lugs 242 and 243 are affixed to a large channel member 245 which is of sufficient size to extend between the upper and lower channels 200 and 201. This channel member is welded or otherwise affixed to the ends 200b and 201b of the beams 200 and 201 (which ends are opposite to the restrained ends 200a and 201a of these beams) thus conveying the force of the springs to the beams 200 and 201.

As may be seen from FIG. 23 a substantial gap is provided between the spring loaded ends of the longitudinally loaded beams and the adjacent restrained ends thereof. In order to bridge this gap and provide an outward biasing means for the portion of the shoes lying between adjacent ends of said beams, the large channel 245 which, as I have described heretofore, is disposed between the beams 200 and 201 and secured to said beams at their loaded ends, also extends beyond the ends of these beams and passes between the next succeeding pair of said beams at their restrained ends for sufficient distance to insure a connecting bridge between the longitudinally compressed beams during maximum horizontal movement of said beams as they move circumferentially to accommodate for inward and outward movement of the shoes. A further feature of this sliding connection is the provision of rollers 250 and 251 mounted on the axle 252 which is rotatably mounted between the upper and lower clips 215 and 215a. This arrangement of rollers forces the channel 245 outwardly against the shoes by virtue of the outwardly directed component of force on clips 215 and 215a caused by the force communicated to restrainer hinge assembly by the load on the beams 200 and 201. It has been found from experience that the channel member 245 must be constructed with a radius of curvature which is slightly less than the radius of curvature theoretically required for the inward position of the shoes at their position of greatest inward travel. This is necessary since in this embodiment of my invention the force of the spring at the point of attachment tends to pull the loaded end of the large channel inwardly in a radial direction and thus cause the channel 245 to rotate slightly about the axis of the rollers 250 and 251 so that the free end of channel 245 will bind against the shoes and thus inhibit the free movement of the spring assembly.

It will be apparent that the operation of my outward biasing mechanism will require substantial longitudinal movement of the loaded beams during maximum movement of the shoes in adjusting to conform to variations in the diameter of the tank. Accordingly, in some installations it may be desirable to provide roller bearings secured to the channels and bearing against the shoes to reduce the friction between the beams and the shoes during the relative movement of the beams across the shoes. Such friction, if excessive, would not only interfere with the operation of the beams but might also cause the shoe-supporting hinges to lock due to horizontal force on the shoe. However, I have found that in actual operation no substantial difficulty is experienced in the free movement of three-inch channel beams without the use of rollers.

Although I have described a spring mechanism and a restrainer hinge assembly for use with my end loaded beams, other type devices may be used to replace those shown and described. It will be apparent that other force-producing means, are within the scope of my invention and may be used to replace the springs and also other equivalent restrainer means may be used to replace the hinge shown.

The floating roof sealing means I have described are shown installed in FIGS. 5, 7 and 18 and a fragmentary isometric view is shown in FIG. 19. It should be understood that the radially extensible supporting means for the shoes which I have shown in FIGS. 13 through 18 have an important cooperative relationship with my outward biasing means for said shoes. The supporting means I have devised are not only adapted for installation with the arcuate compressed beams I have described, but are also adapted to prevent, or substantially restrain, circumferential movement of the shoes which would result because of friction between the shoes and the beams if the lateral restraining means I provide in my shoe support mechanism were omitted.

One of the advantages of my support mechanism for the shoes is that this mechanism is adapted for convenient installation of a rain shield to protect the sealing mechanism and the flexible seal itself without interfering with the operation of the shoe support means and the outward biasing means for said shoes. The rain shield I have devised comprises a plurality of thin plates 260 which are attached to the shoes by bolts 261 (FIG. 5) or by the attaching clips 262 shown in FIG. 7. These rain shield plates are overlapped and are preferably somewhat shorter than the plates of the shoes. They slope generally downwardly in an inward direction with a sufficient length in said inward radial direction to overlap the upstanding outer wall or rim of the floating roof when the shoes are permitted to move to their outermost position. I prefer to use plates as shown in FIGS. 5, 7 and 18, which are provided with a downwardly disposed lip 263 which, in the case of the pontoon-type roof, may rest on the top surface of the pontoon.

The forms of my floating roof seal which I have described heretofore have been shown as they may be used with a pontoon-type floating roof. However, this seal mechanism is adapted for use with other type roofs and offers the advantages of relatively few parts and the further advantage that these parts are made so that they are interchangeable between tanks of various diameters and various types of floating roofs, and they may be manufactured by mass production methods. As further examples of the use of my seal mechanism, FIG. 11 illustrates the use of such a seal with a twin-deck roof. In this installation the seal mechanism is supported by the vertical cylindrical rim 265; otherwise; the installation of this seal may be the same as that described for the pontoon-type roof. Likewise, in FIG. 12 an embodiment of my seal is shown installed in combination with a pan-type roof. In this construction the radial girders 10a are carried out to the upstanding rim 266, which is braced by the use of the gusset plate 267. This upstanding rim 266 functions as a supporting means for the seal mechanism.

Other modifications of my sealing arrangement will be apparent to those skilled in the art as, for example, the modification shown in FIG. 31 might be adapted for use with longitudinally loaded beams employed in the manner I have previously described, but with the spring mechanism located in a recess in the top surface of a floating roof or in a compartment above the roof rather than between the floating roof and the shoes whereby this mechanism will not take up any space within the area between the roof deck and the sidewall of the tank. Thus a greater overall movement of the shoes in a radial direction might be permitted.

*Low Pressure storage tanks for volatile liquids and gases*

I have heretofore described the use of my novel sealing means in combination with floating roof tanks. However, the mechanisms I have invented for use with floating roof seals may be modified for use in structures for the storage of highly volatile liquids in combination with a floating roof or for use in combination with a gas holder piston. My pressure storage seals are illustrated in FIGS. 24 through 30 in which various modifications of the gas seals I employ are shown, in each instance these drawings illustrate modifications which employ the outward biasing mechanisms I have invented in combination with the novel means I have discovered for the construction of seals for pressure-tight storage of highly volatile liquids and gases.

There are a number of basic designs used in the fabrication of gas holders and other pressure storage devices, such as the water-seal gas holder, and various piston-type gas holders. My sealing means is adapted for use with piston-type gas holders and the like. In this invention the sealing mechanism illustrated in FIGS. 25 and 26 is a modification of the mechanisms which I have described for use in combination with a conventional floating roof used for storage of liquids with relatively low vapor pressures. In my pressure storage seal, as in the floating roof seal, a plurality of shoes are used which expand or contract radially and arcuate beams which are compressed longitudinally by spring loading so as to bow laterally to force the shoes outwardly against the shell 300 of the tank. As will be apparent from the drawings and the following description of the operation and construction of my pressure storage seals, a number of major modifications are necessary in the construction of sealing mechanisms in order to adapt my sealing mechanisms for service in pressure storage.

I have discovered that an effective pressure storage seal may be usefully employed in combination with a floating roof for the storage of volatile liquids if a weighted roof or a heavy roof body is used to subject the stored liquid to a greater pressure than its vapor pressure at the temperature of storage. Such a floating roof and pressure seal combination is illustrated in FIGS. 31 and 32 in the accompanying drawings wherein the floating roof comprises a relatively heavy reinforced concrete structure.

The pressure seal employed in this floating roof, as well as in my gas holder which will be described hereafter, is illustrated in FIGS. 24, 25, 26 and 28. The restrainer hinge which is used in combination with the channels 302 and 303 is shown also in FIG. 27 in which the upper leaf 310 appears as it is used in the seal assembly of a gas holder piston. As may be seen in that illustration as well as the illustration of the pressure storage floating roof shown in FIG. 26, this hinge comprises an upper leaf 310 and a lower leaf 312 interconnected by web 313. This hinge is rotatably connected to the roof body by means such as lug 315 and pin 316 (FIG. 27) connecting the upper leaf to the periphery of the roof. The connection to the channels 302 and 303 shown in FIG. 26 is a rotatable connection by means of pins 317 and 318 passing through the hinge members 310 and 312 and through the lugs 320 and 321 which are respectively affixed to the channels 302 and 303 adjacent the restrained ends 302a and 303a thereof. The shoes 301, in turn, are maintained properly positioned by guide lugs 304, 305, 306, and 307 which slidably receive beams 302 and 303 therebetween.

In this combined shoe supporting and biasing means, I also provide a plurality of supporting hinges disposed around the periphery of the roof deck such as the hinge illustrated in FIG. 28. The assembly of this hinge may be seen in the gas holder application of this feature of my invention in FIG. 27. These hinges comprise an upper hinge element 325 and a vertically aligned lower element 326; these elements are inter-connected by the web 327. These supporting hinges are rotatably attached to the periphery of the roof by pins 328 which pass through the hinge and lug 329 affixed to the roof. This supporting hinge is connected by sliding attachments to the beams 302, and 303, as shown in FIG. 28. This attaching assembly comprises a pair of sliding bars 330 and 331 which fit within the recesses defined by the flanges of channels 302 and 303, respectively, and which are retained in position by an upper pair of guide members 332 and 333 secured to the flanges of the channel 302 and a lower pair of guide members 334 and 335 secured to the flanges of channel 303. This pair of sliding bars 330 and 331 have affixed at their central points a pair of connecting lugs 336 and 337 respectively which lugs are rotatably affixed to the supporting hinge by means of the pin 338 at the upper channel and a similar pin (not shown) at the lower channel.

I have described how my modified pressure sealing mechanism employs the outward biasing means as a means of supporting the shoes; I will now describe the modifications of the novel biasing means employed in my pressure seal mechanism. Features of this modification are shown in FIGS. 24–26 and 32 as they are applied to the pressure storage floating roof and this type seal mechanism is further illustrated as it is applied in the gas holder shown in FIG. 27.

As may be seen in FIGS. 31 and 32 the spring assembly 350 is housed in the recess 351 in the floating roof body and it is operatively connected to the beams 302 and 303 by flexible means such as cables 355 and 356. The cables 355 and 356 pass from the spring mechanism to the cable guide (shown in the detailed sub-assembly in FIG. 24) comprising a pair of vertically aligned interconnected sheave assemblies. As may be seen in FIG. 29 in which this cable guide is shown in combination with a gas holder piston, the cable guide frame comprises a sheave support in which upper plate 357 and lower plate 357a are interconnected by a spacer plate 359. The upper plate 357 and the lower plate 357a are rotatably secured to the roof or gas holder piston by lugs 360 and 360a and pins 361 and 361a respectively. Each sheave assembly comprises a pair of horizontally spaced sheave wheels. The upper cable is caused to pass around a first sheave wheel 362 and, in reverse direction, around a second sheave wheel 363 which aligns the cable with the upper shackle 365 shown in FIG. 26. In similar manner the lower cable passes around each of the lower pair of sheave wheels 362a and 363a so that it is aligned with the lower shackle 366. As may be seen in FIG. 26 these cables are operatively connected to the shackles 365 and 366 by loop clips 367 and 368 respectively and the shackles are secured to the vertical plate 370. The plate 370 is bolted or otherwise suitably affixed to an upper sliding bar 371 and a lower sliding bar 371a respectively. These sliding bars 371 and 371a are so configured and arranged as to fit into the recesses formed by the flanges of the upper and lower beams 302 and 303 respectively adjacent the ends 302b and 303b of said beams and they are affixed to these beams by any suitable means such as the bolts 372 shown in FIG. 26 or by welding. Thus the force from the spring assembly 350 (FIG. 31) is communicated to the beams 302 and 303 at the ends of said beams which are affixed to the sliding bars 371 and 371a.

It should be noted that the upper and lower sheave wheels 362 and 362a are rotatably mounted on shaft 373 which is positioned a short distance from pins 361 and 361a so as to cause the entire cable guide assembly to rotate about pins 361 and 361a when the cables are drawn taut by the spring assembly. Thus the outer extremity of the cable guide is maintained in sliding engagement with the beams 302 and 303. The upper and lower sheave wheels 363 and 363a (see FIG. 29) are rotatably mounted on shaft 374 which is affixed to and passes through the upper and lower plates 357 and 357a a sufficient distance to permit the upper roller wheel 375 and lower roller wheel 375a to be rotatably mounted thereon in spaced relationship such that they will be received by the recess formed by the channels 302 and 303 respectively.

It will be noted from FIG. 26 that the bars 371 and 371a have relatively long slotted arcuate extensions projecting generally horizontally across the plates to bridge the gap between the loaded end of one pair of columns and the restrained end of the next adjoining pair of columns thereby providing a supporting and biasing means for the shoes intermediate the horizontally spaced ends of the columns. The purpose of the slots 376 and 376a is to provide an opening to receive the lugs 320 and 321 respectively and thus permit these bars to move freely relative to the restrained ends 302a and 303a of beams 302 and 303. The overlapping ends of these sliding members are maintained in their position within the channels by means of the blocks 377 and 378.

Another feature of these sliding bars is the provision of a tapered portion 380 on the outside of the bar adjacent to the loaded end of beam 302 and a similar tapered outer portion 386 adjacent the loaded end of beam 303. The purpose of this tapered portion is to provide an inclined plane mergent with the loaded end of the beam to prevent this end of said beam from catching on the edges of the spaced shoes 301 as the beams move horizontally across the shoes when the biasing mechanism is in operation.

In combination with the shoes I have described and the supporting and biasing means therefor, I employ a rubber coated fabric seal 400 (FIG. 25) on the outside of the shoes, which is secured at its lower edge by any suitable means to the flange 401 which is integral with the upstanding rim 402. The rim 402 is attached to the lower perimeter of the roof by securing said rim to the bottom plate 403. In the embodiment shown, the seal is attached to the flange 401 by the strip 405 which passes over the inner edge of the seal 400 and is secured by a plurality of bolts 406 and nuts 407.

As may be seen in FIG. 25 a substantial area of fabric extends below the shoe 301 and connects to the flange 401. If unsupported, this area of sealing material would be bulged upwardly because of the pressure within the tank and thus be subjected to excessive wear against the shoes. In order to prevent wear from this source, I provide resilient metallic plates 410 which are attached to the shoes by means of the angle clip 307 (which also serves as a lower guide member for the channel 303) and this resilient metallic member passes arcuately down and across the head of the bolts 406 or the retaining strip 405. One of these resilient members is provided for each of the shoes so that the roof has a plurality of these members maintaining the seal in a downwardly disposed fold.

The rubber coated fabric I employ in my pressure seals may be attached to the shoes by any suitable means such as by rubber cement or by riveting the fabric to the center of the tops of the shoes. It is necessary that the rubber coated fabric be made so that there will be a certain amount of stretch or elongation within the fabric. This is necessary to provide for the increase and decrease in circumferential length of the fabric ring as the sealing mechanism varies in diameter to accommodate for increase or decrease in the diameter of the shell. This expansion and contraction of the rubber fabric may be accomplished by using an open weave in the fabric or a loosely woven fabric or by cutting on the bias in the direction of stretch so that the rubber-covered fabric may have sufficient resiliency to elongate and contract as necessary. This cannot ordinarily be accomplished by using standard weaves since the fibers of the fabric do not stretch a sufficient amount before failure of the fibers or parting of their bond with the rubber.

The fabric employed in the seal may be either woven from an asbestos fiber, a cotton fiber or plastic, or synthetic fabric fibers such as rayon, nylon, or Dacron or the like. In addition, glass cloth or glass fibers may be employed; however, since it is necessary that the impervious fabric expand and contract with the increase or decrease in diameter and circumference of the seal, it is desirable to use fibers in the fabric which are to some extent flexible and yet bond readily with the covering rubber compound. This is best achieved by using asbestos, cotton or rayon materials; it is more difficult to bond the harder plastic filaments such as nylon, Dacron and glass.

On the outside of the sealing mechanism I have described in connection with the illustrations shown in FIGS. 25 and 26, I provide one or more packing rings or rubber bar seals of a suitable resilient material such as low durometer rubber which is soft and pliable or foam rubber encased in rubber-coated fabric. In the embodiment shown in FIGS. 25 and 26, an upper ring 420 and a lower ring 421 are used. These rings are of low durometer rubber configured so that they are substantially rectangular in cross section as shown, FIG. 25. They are spaced apart so that an annular space is defined between the shoes and the shell and the two rings. These rubber packing rings conform to any irregularities in the shell and thus minimize leakage of gas or vapors between the rings and the shell. Moreover, I prefer to employ a plurality of circumferentially aligned grooves 422 in the outer edge of the packing rings as shown in FIG. 26 to define flexible ridges which make a more efficient sealing contact with the shell.

The packing rings are secured to the shoes by stud bolts 425 which are attached to the shoes and pass through the fabric outside the shoe and through the packing ring. A recess 426 is provided in the packing ring at each point of attachment to accommodate the nut 427 and any washers which may be used so that these metal parts will not interfere with the sealing action of the rubber packing rings 420 and 421. These heavy rubber packing rings, in addition to serving as a sealing means for vapors and gases, have a cooperative function with the shoes themselves since it is by the attachment of shoes to the sealing rings that the shoes are maintained in circumferentially aligned spaced relationship with one another.

It will be apparent to those skilled in the art that other means of attaching the packing rings may be used as for example, the resilient fabric 400 may be passed over the outside of the rubber packing rings and the entire fabric and sealing rings attached to the shoes by a suitable cement bond. Any suitable attaching means for these packing rings is within the scope of my invention and such means may be used in the practice thereof insofar as such modifications are within the true spirit and scope of the claims appended hereto.

As before mentioned, the outward biasing means I employ in my pressure storage seals is substantially the same as that used in my floating roof seal mechanisms. It should be noted that the beams 302 and 303 may be conveniently positioned to press against the shoes at a height which will maintain each of them in opposed relationship to one of the rubber packing rings 420 or 421 as shown in FIGS. 25 and 26. By thus maintaining the beams in this position against the shoes, the outward pressure developed by the beams as a result of the operation of the longitudinal load imposed on said beams will be communicated directly to the adjacent packing ring and through it to the shell. Other locations for the longitudinally loaded beams may be employed if desired, but in such event a thicker plate may be required in the shoe or other reinforcing may be required to prevent bending or dislocation of the shoe.

Since most hydrocarbon vapors or gases contain a certain amount of $H_2S$ gas which may condense to a liquid state, it is desirable that the materials used to cover the fabric and the materials used for the packing rings be made of a composition which is not soluble in, and does not soften in, such gases or condensed vapors when these structures are employed in the storage of petroleum products. It is therefore recommended that the rubber material covering the fabric and the material of the packing rings, as well as any covering therefor, be composed of Neoprene, "Buna-N," "Thiokol" or the like, or a composition of these materials.

The pressure seals I have described heretofore are shown installed in combination with a reinforced concrete roof in FIGS. 31 and 32. This roof structure has a compartmented twin-deck body 450, and inverted conical bottom floor 403 composed of sheet metal plates and a peripheral sheet metal rim 402 which has been described as illustrated in FIG. 25 in connection with the attachment of the peripheral seal. The metal plates at the bottom and the periphery are not essential to my invention and may obviously be omitted if sufficient reinforcing steel is employed in the concrete body to give it the necessary strength and if a suitable attaching rim for the seal is provided to take the place of the flange 401.

The use of a concrete structure has several advantages not present in floating roofs known to the art prior to my invention. Such a roof may be cheaply constructed and provides sufficient weight below the center of buoyancy to insure stability of the roof even under extraordinary stresses from wind, rain or snow. The weight of the body of the roof is sufficient to impose substantial pressure upon the gas or liquid contained therein. This pressure is primarily determined by the gross weight per cubic foot of the entire floating roof including the air compartments and this weight may be made as great as desired either initially or by use of weights on top of the roof within the pressure limits set by the maximum pressure which can be retained by the packing ring seals. These seals may be constructed to withstand pressures of several pounds per square inch, the exact amount depending upon the number of packing rings used, the type of rubber and material used in the packing rings, the condition of the shell of the tank, and other design details.

In FIGS. 31 and 32, a leveling mechanism is shown installed in combination with this floating roof structure. The function of this apparatus is to maintain the roof level and thereby prevent partial upsetting of the roof by accumulating vapors or gases on one side of the tank such as might occur when volatile liquids are stored in the tank and one side of the tank is heated by the sun. Although I prefer to employ a leveling mechanism of my own invention, as shown, for instance, in FIG. 29, any suitable leveling means of conventional design such as those now known to the art may be employed. The use of such a leveling mechanism in combination with a floating roof of this type also makes possible the storage of gases in such a tank in the manner of a piston type gas holder provided the weight of the roof is not excessive and the structure is designed to permit an effective gas retaining seal.

In combination with the seals described above it is desirable to incorporate devices for flowing lubricating oil or other fluids over the pressure seals so that the friction between the shell and the packing rings is reduced. Such lubricating fluids increase the efficiency of the seal and reduce the wear of the packing rings. The use of lubricating fluids may be accomplished by pumping a small quantity of such oil or other viscous fluid over the top packing ring where it clings to the wall as the seal moves upward and downward. The fluid eventually flows down into the gas or liquid storage area where it is accumulated and pumped back over the sealing mechanism again. When hydrocarbon liquids are stored I have found that a mixture of water and ethylene glycol may be used advantageously. This mixture is not miscible with gasoline and the ethylene glycol does not leach out of the water solution into the hydrocrabon liquid.

*Gas holder*

The pressure retaining seals I have heretofore described in connection with my reinforced concrete floating roof storage tank are particularly adapted for use in a gas holder of the piston type. It is not necessary to provide tolerance for the great expansion or contraction needed in floating roofs in the case of gas holders because gas holders are usually built more carefully and out-of-roundness encountered is not as great as that found in a floating roof. Where a tank for a floating roof has been dismantled and rebuilt or where such a tank was originally built as a riveted tank, the sealing mechanism must provide for a total movement of the seal mechanism of between 10 and 15 inches. In the gas holder, a total movement of 5 to 10 inches is usually sufficient to take care of any irregularities or out-of-roundness of the shell.

Accordingly, the sealing mechanism for pressure storage which I have described in detail for use with a reinforced concrete floating roof tank and which has been described in connection with the accompanying drawings FIGS. 24–26 and 32, may be used in combination with my piston type gas holder structure. As may be seen in FIG. 29, the gas holder piston has a conical or cup shaped bottom 500 which serves as the top closure for the gas compartment. A box housing 501 of rectangular cross-section is disposed across a diameter of the piston and contains a spring mechanism essentially the same as that heretofore described in use in my floating roof structure including springs 230 which are anchored to a vertical wall of said housing by appropriate pin connections co-operating with the lugs 502 and 503. The tension of the springs may be varied by varying the point of attachment of the pins with the connecting bars 504 and 505, respectively.

The springs 230 are operatively connected to the beams 302 and 303 by means of cables 510 and 511 (FIG. 27) which pass through the sheave assembly in the manner previously described in connection with my reinforced concrete roof structure.

A second housing member 515 of substantially rectangular cross-section is provided at substantially a right angle to the axis of the first housing member 501. It should be noted that the housing 515 in FIG. 27 does not contain the spring assemblies and this housing member may be substantially smaller in height than the height of the member 501. These housing members serve to give rigidity to the piston as well as house the parts of the spring assembly and the leveling mechanism.

As has been previously mentioned the seal mechanism employed in my gas holder piston is substantially the same as that employed in my previously described pressure type floating roof. However, it should be noted that an additional feature is shown in FIG. 27 comprising a horizontally disposed hinge 525 operatively connected between the piston and an oversized shoe 526. This hinge may be the same as that illustrated in FIGS. 15 and 16 and it is installed in a substantially horizontal plane so that the shoe 526 may be moved radially inwardly but cannot move in a circumferential direction. Thus, this hinge functions as a restrainer to prevent circumferential movement of the plurality of spaced shoes. It is preferably installed as shown in FIG. 27 at a point adjacent the loaded end of the beams since most of the movement of said beams across the shoes during operation of the sealing mechanism will take place at this end of the beams. By thus restraining circumferential movement of the shoes and the attached rubber bar seals or packing rings at this point the restraint is communicated by means of the rubber bar seals to the plurality of shoes which are interconnected by said rubber bar seals so that the shoes are substantially prevented from circumferential rotation.

In FIG. 27 I have shown outward biasing means comprising two complete assemblies of channels and spring actuating mechanisms of such length that they encircle the gas holder piston. However, in the case of very large gas holders a greater number of these assemblies may be used in the manner shown by providing a plurality of radially disposed housing sections or recesses such as the recess 351 in the embodiment shown in FIGS. 31 and 32 or the spring mechanisms may be located in the annular space between the piston and the seal plates in the manner shown in my floating roof tank.

It should be noted that, for clarity, details of my leveling mechanism have been omitted in FIG. 27. In FIG. 29, I have shown a leveling mechanism which is a novel leveling means of my own invention; however, other leveling means now known to the art may be used in combination with the sealing means I have described.

As I have previously described in connection with my pressure storage floating roof, it is desirable to flow a lubricating oil or other liquid over the packing rings of the gas holder. In the embodiment shown in FIG. 29 the lubricating fluid which runs down the inner face of the tank wall is permitted to accumulate in the circumferential reservoir between the retaining ring 550 and in the wall of the gas holder 551. In the form shown, the leveling mechanism has a cable passing through the bottom of the gas holder into the oil storage chamber 555 and out the pipe 556 which serves, also, as a filling spout for the chamber. Thus, the oil fills the chamber 555 and rises in the pipe 556 to a level determined by the pressure of the gas within the gas holder. This collected oil may be pumped by means not shown back to the rubbing faces of packing rings 420 and 421.

A modification of my gas holder invention is shown in FIG. 30 which illustrates a breather roof for a storage tank for volatile liquids. The use of breather roofs is highly desirable as a means of permitting expansion and contraction of the gases and vapors above the liquid stored in the tank without loss of such vapors from the storage system. My piston type gas holder may be conveniently adapted for this service by installing a cylindrical shell 556a of such gas holder within the roof 557 of the storage tank so that the sides of the shell 556a project downwardly within the storage tank for a short distance. The other features of this breather roof are the same as the gas holder except that there is no bottom closure at the base of this cylinder 556a. At the base of the shell 556a, I provide a trough for the seal lubricant having a bottom 558 with ports 559 communicating into the sheave chambers 560. The sides of this trough are defined by the wall 556a and the rim 561. In operation, the piston 500 will move upward and downward to accommodate the storage volume to the volume necessary for the vapor and gas volume within the tank as it heats and cools. The liquid chambers 560 functions in the same manner as in a gas holder with the additional advantage that since the liquid stored therein will communicate upwardly into the tubes 562, these tubes also function as an emergency relief valve in this structure. In other words, if an unusual pressure should be reached within the storage tank it will cause the liquid contained in these chambers to blow out the tubes 562 and vent the excessive pressure before the pressure becomes high enough to rupture the plates of the tank. Although, for clarity, only a single leveling assembly is shown in FIG. 30, it should be understood that one or more additional assemblies will be used in order to insure leveling of the pistons in all directions.

While I have described what I presently consider to be the preferred embodiments of my invention, it will be understood that various other modifications may be made therein, and I intend to cover in the appended claims all such modifications as fall within the true spirit and scope of my invention.

What I claim as new and desire to secure by Letters Patent is:

1. A storage tank for fluids, comprising a storage chamber having a cylindrical casing, a fixed bottom closure and a reciprocally movable upper closure within said casing, said upper closure comprising a piston and a peripheral seal disposed intermediate said piston and said casing, said peripheral seal comprising a sealing means, biasing means for urging said seal outwardly into engagement with the inner surface of said cylindrical casing, said biasing means comprising two vertically spaced, horizontally disposed arcuate beams, a restraining means operatively connected to one end of each of said beams and to said piston and a compressing means acting to compress said beams longitudinally, said compressing means being operatively connected to the other end of each of said beams and said piston.

2. A fluid storage tank, comprising a substantially cylindrical casing closed at its lower end, closure means above said lower end and reciprocable within said casing to form therewith a variable volume storage chamber, said closure means comprising a rigid body portion with peripheral sealing means supported thereon, and an outward biasing means for said sealing means including a substantially horizontally disposed, substantially arcuate, slender beam, and compressing means operatively connecting the ends of said beam to said body, said compressing means being carried by said body and constructed and arranged to laterally deflect said beam by applying a longitudinal compressing force thereon so as to deflect the portion of said beam intermediate its ends toward said casing.

3. The combination defined in claim 2 in which said sealing means comprises radially extensible overlapping shoes and an impervious flexible seal disposed between said shoes and said rigid body, and said beam being disposed between the body and said shoes in sliding engagement with a plurality of said shoes.

4. A storage tank for liquids or gases comprising a casing with a fixed bottom closure, an upper closure movable vertically within said casing whereby the enclosed volume of said storage tank may be varied; said upper closure comprising a rigid piston having integral radial bracing, and a peripheral sealing means supported by said piston; said sealing means comprising a plurality of radially extensible vertical plates, a curtain-like impervious flexible seal disposed between said piston and said plates, and an outward biasing means for said seal including a horizontally disposed, arcuate, slender compression member, a restraining mechanism operatively connecting one end of said compression member to said piston and a compressing mechanism operatively connecting the other end of said member to said piston, said compressing mechanism being so constructed and arranged as to impose a force longitudinally upon said compression member to bow said compression member outwardly against a plurality of said vertical plates contiguous to said compression member whereby said vertical plates are urged into engagement with the wall of said casing.

5. The combination described in claim 4, in which the compressing mechanism includes an adjustable force spring biasing means.

6. The combination of a piston for a fluid storage tank and a peripheral sealing means supported by said piston, said sealing means comprising a plurality of radially extensible shoes and a flexible seal disposed between said shoes and said piston, an outward biasing means for said shoes comprising a plurality of circumferentially aligned arcuate, slender beams the ends of each of said beams, being horizontally spaced from the ends of adjacent circumferentially aligned beams, each of said plurality of beams being disposed adjacent said shoes and operatively connected at its ends to said piston by means of a restraining mechanism and a compressive mechanism so constructed and arranged as to impose a force longitudinally upon said beam to yieldingly force the portion of said beam intermediate its ends against the inner side of said shoes.

7. The combination defined in claim 6 having a bridging means disposed circumferentially between the spaced ends of adjacent circumferentially aligned beams to urge said shoes outwardly intermediate horizontally spaced ends of said beams.

8. A storage tank for fluids comprising a storage chamber having a cylindrical casing, a fixed bottom closure and a reciprocally movable upper closure within said casing, said upper closure comprising a piston, a peripheral seal disposed between said piston and said casing, comprising a sealing means and an outward biasing means for urging said sealing means outwardly toward the inner wall of said casing, said biasing means comprising a co-planar upper row and a co-planar lower row of circumferentially aligned arcuate beams, the beams in each co-planar row being disposed adjacent said sealing means in spaced end-to-end relationship with one another, a restraining means operatively connected to one end of each of said beams and to said piston, and a compressing means operatively connected to the other end of each of said beams and to said piston to bend said beam in an outwardly disposed arc intermediate its ends.

9. The combination defined in claim 8 which includes a bridging member disposed adjacent to said peripheral seal between the upper and lower circumferentially aligned beams and in overlapping relationship with the adjacent ends of said horizontally spaced beams.

10. In a seal for a floating roof tank, the combination of a plurality of outwardly movable overlapping shoes and an outward biasing means for said shoes said biasing means comprising a relatively long, flexible beam carried by said roof and passing in a substantially horizontal direction across said plurality of shoes, a restraining means attached to one end of said beam to prevent substantial longitudinal movement thereof, and a compressing means attached to the other end of said beam to provide a force acting longitudinally relative to said beam to cause the beam to deflect outwardly and press against said shoes intermediate the ends of said beam.

11. In a seal for a floating roof tank, a plurality of shoes disposed in sliding engagement with an inner side wall of said tank, outwardly extensibe supporting means for said shoes, means for preventing circumferential movement of said shoes, and outward biasing means to force said shoes into sliding engagement with said inner side wall, said outward biasing means comprising at least one elongated beam having a restrained end and a compressing means operatively connected to the opposite end of said beam to provide a force acting longitudinally relative to said beam to cause the beam to deflect outwardly and press against said shoes intermediate the ends of said beam.

12. In an upright, substantially cylindrical tank, the combination of a substantially circular floating roof and an annular seal therearound, said seal comprising a plurality of shoes, hinged means supporting said shoes on said roof, said hinged means restricting said shoes to radial inward and outward movements, and an outward biasing means for urging said shoes into engagement with the side wall of the tank, said biasing means comprising a bowed, resilient, horizontal beam slidably engaging the inner sides of a plurality of said shoes, longitudinal compressing means operatively connected to one end of said beam, and horizontally rotatable supporting and restraining means connecting the opposite end of said beam and said roof to restrain said beam and maintain it in engagement with said shoes by inward and outward rotation thereof with respect to said roof, said supporting means being so constructed that said beam moves horizontally across said shoes in sliding engagement with said shoes as they move radially inwardly and outwardly with respect to said roof.

13. In a substantially cylindrical fluid storage tank, the combination of a substantially circular floating roof body vertically movable within said tank, a plurality of circumferentially spaced, vertical arcuate shoes in slidable face engagement with the cylindrical wall of said tank, radially extensible members carried by said roof body to support said shoes thereon, biasing means for urging said arcuate shoes outwardly comprising a slender arcuate beam disposed horizontally, said beam having a substantially convex longitudinal surface presented toward a plurality of said shoes, supporting means carried upon said body to maintain said beam adjacent said shoes, and means for applying longitudinal compression forces to the ends of said beam to cause lateral deflection thereof outwardly against said shoes, and an annular elastic curtain sealed imperviously around its inner arcuate edge to said roof and along its outer arcuate edge to the lower edge of each of said shoes, said curtain having a plurality of flaps extending from the outer edge thereof, each of said flaps extending between two adjacent, spaced shoes, each lateral edge of said flap being sealed to one of said shoes along a line spaced from the lateral edge thereof.

14. A storage tank for volatile liquids comprising an outer casing, a circular floating roof within said outer casing, said floating roof comprising a cellular concrete body having a diameter less than the diameter of the outer casing, and an annular sealing means disposed between said roof and said casing, said sealing means comprising a plurality of circumferentially spaced radially movable shoes supported on said roof and spaced radially therefrom, a resilient fabric curtain sealed imperviously between the periphery of said roof and secured to the outer surface of said shoes, at least one resilient packing ring surrounding said plurality of shoes and affixed to said outer surface thereof, an outward biasing and supporting mechanism for said shoes comprising a flexible beam disposed horizontally in sliding engagement with an arcuate series of said shoes, means for imposing compressive force longitudinally upon the ends of said beam to bow it intermediate its ends and thereby bias said shoes outwardly, guide members affixed to said shoes to slidingly engage said beam and to support said shoes thereon, and restraining means to limit movement of a series of said shoes to a substantially radial path, said restraining means comprising a hinge pivotally connected to at least one shoe in said series of said shoes and to said roof, said hinge being disposed to open and close in a plane transverse to the longitudinal axis of said beam.

15. A vessel for the storage of fluids under pressure comprising a casing, a piston movable within said casing, a plurality of spaced shoes encircling said piston, outwardly extensible means carried on said piston for supporting and outwardly biasing said shoes, said supporting and outwardly biasing means comprising a slender resilient beam passing across a plurality of said shoes and slidably engaging the inner side of said shoes, a pair of guide members affixed to each of said shoes and disposed on opposite sides of said beam, a restraining member pivotally securing one end of said beam to said piston to prevent substantial longitudinal movement of said one end, a compressing means carried on said piston and operatively connected to the other end of said beam, a plurality of supporting members rotatably affixed to said piston and rotatably and slidably connected to said beam at points intermediate the ends thereof to support said beam in a position substantially circumferentially aligned with and radially spaced from said piston.

16. The combination defined in claim 15 including a resilient flexible impervious fabric seal disposed between said shoes and said piston and affixed to said shoes on the outside surface thereof, and a circumferential resilient packing member disposed between said fabric seal and the inner wall of said casing.

17. In a vessel for storage of liquids, a floating roof supported on the liquid so that an annular space is formed between the edge of the roof and the vessel wall, a plurality of shoes encircling said roof and spaced outwardly from the edge thereof, an upper and lower interconnected pair of extensible supports interconnected to move in unison, said supports being carried by said roof and connecting each of said shoes to said roof, unitary means comprising an elongate substantially horizontally disposed arcuate beam arranged for yieldingly pressing a plurality of said shoes outwardly into engagement with the vessel wall, and means applying longitudinal compressive force to the ends of said beam for arcuately straining the same in a manner to urge said shoes into forceful engagement with the tank wall.

18. In a substantially cylindrical storage tank for fluids having a floating roof of slightly smaller diameter than said tank reciprocally movable therein, a radially extensible peripheral sealing means supported by said roof and disposed in the peripheral space between said floating roof and the side wall of said cylindrical tank the improvement comprising, a plurality of circumferentially spaced shoes encircling said roof and radially spaced therefrom, radially extensible supports connecting said shoes to said roof, biasing means adapted to urge said sealing means outwardly, said biasing means comprising a slender arcuate beam disposed horizontally, said beam having a substantially convex longitudinal surface presented toward a plurality of said shoes, supporting means carried upon said roof to maintain said beam adjacent said shoes, means to apply longitudinal compressive force to the ends of said beam to cause lateral deflection thereof outwardly against said shoes, a plurality of substantially horizontal arcuate flexible impervious curtains, each of said curtains being sealed along the inner arcuate edge thereof to said roof and along the outer arcuate edge to one of said plurality of shoes, and a plurality of elastic sheets disposed intermediate said arcuate curtains, the parallel lateral edges of each of said sheets being sealed to the adjacent edges of said curtains and to adjacent shoes along lines spaced from adjacent ends of said shoes, and the inner edge of each of said sheets being sealed to said roof.

19. A storage tank for volatile liquids comprising an outer casing, a floating roof within said outer casing, said floating roof comprising a relatively heavy body having a circular shape with a diameter less than the diameter of the outer casing, and a peripheral seal disposed between said roof and said casing, said peripheral seal comprising an impervious seal disposed between the periphery of said roof and said casing, a biasing means to urge said impervious seal outwardly into engagement with the side wall of said casing, said biasing means comprising a flexible beam disposed adjacent said impervious seal and means for imposing compressive force longitudinally to the ends of said beam to bow it intermediate its ends and thereby bias said seal outwardly, and a resilient packing ring disposed between said seal and the wall of said casing.

20. In a seal for the peripheral space between the side wall of a tank and a floating roof therein, a plurality of overlapping shoes encircling said roof and outwardly spaced from the periphery thereof, each of said shoes having one end overlapping an adjacent shoe, said one end being disposed between said floating roof and said adjacent shoe and slidingly engaging said adjacent shoe, a hinged member operatively connecting said one end to said roof to permit outward movement of said one end and to substantially restrict movement transverse thereto, said hinged member comprising a first pair of leaves, each of said first pair of leaves being pivotally attached at its outer end to a pivot point adjacent said one end, and a second pair of leaves, each of said second pair of leaves being pivotally connected at one end thereof to the inner end of said first pair of leaves and at its other end to said roof, and means to limit pivotal movement of said second pair of leaves in opposite directions.

21. A storage tank for liquids or gases comprising a casing with a fixed bottom closure, an upper closure movable vertically within said casing whereby a variable volume storage chamber is defined, said upper closure having an impervious body portion and a radially extensible peripheral sealing means supported thereon, outward biasing means for said sealing means including a plurality of vertically spaced arcuate beams having a convex surface presented toward said sealing means, and compressing means adapted to impose sufficient force longitudinally upon said beams to deflect them laterally intermediate their ends, said compressing means being operatively connected to each of said beams at the ends thereof.

22. In a seal of the type having shoes surrounding a floating roof and disposed in the peripheral space between the side wall of the tank and the floating roof therein in sliding engagement with a tank side wall, the improvement comprising an outwardly extensible shoe supporting means carried by said roof to support one of said shoes, a hinge having an outer leaf, an inner leaf and a hinge pivot therebetween, said outer leaf of said hinge being pivotally connected to said shoe and the inner leaf of said hinge being pivotally connected to said roof, said hinge pivot being disposed in a horizontal plane to prevent movement of said last mentioned shoe in a circumferential direction relative to said roof, an impervious seal disposed between said shoes and said floating roof, an outward biasing means for urging a plurality of said shoes into contact with the wall of said tank, said outward biasing means comprising an arcuate beam slidably engaging said shoe and a plurality of adjacent shoes, and a compressing means acting upon opposite ends of said beam to deflect it intermediate its ends outwardly against said shoe and said plurality of adjacent shoes.

23. In a storage tank for liquids or gases having a casing with a fixed bottom closure and an upper impervious body reciprocally movable therein to provide a variable volume storage chamber, the improvement in peripheral sealing means and outward biasing means comprising radially extensible sealing means supported by said body and disposed between said body and said casing, said sealing means slidably engaging the inner wall of said casing, and biasing means for urging said sealing means outwardly, said biasing means comprising a slender, bowed beam disposed horizontally, supporting means arranged to maintain said beam adjacent said sealing means with its convex longitudinal surface presented toward said sealing means, and means for applying longitudinal compressive forces to the opposite ends of said beam to cause lateral deflection thereof outwardly against said sealing means.

24. The combination defined in claim 23 in which said sealing means comprises radially extensible shoes and said beam is disposed between said body and said shoes in sliding engagement with a plurality of said shoes.

25. The combination defined in claim 23 in which said slender arcuate beam has an $l/r$ ratio above 200.

References Cited in the file of this patent
UNITED STATES PATENTS

| | | |
|---|---|---|
| 1,426,998 | Leland et al. | Aug. 22, 1922 |
| 1,666,416 | Griffin | Apr. 17, 1928 |
| 1,748,231 | Kimbell | Feb. 25, 1930 |
| 1,930,953 | Hampton | Oct. 17, 1933 |
| 1,932,403 | Garske | Oct. 31, 1933 |
| 2,006,505 | Lentschewsky | July 2, 1935 |
| 2,282,772 | Wiggins | May 12, 1942 |
| 2,287,211 | Wiggins | June 23, 1942 |
| 2,495,755 | Orr et al. | Jan. 31, 1950 |
| 2,536,019 | Allen | Jan. 2, 1951 |